(12) United States Patent
Yamamoto et al.

(10) Patent No.: US 9,037,623 B2
(45) Date of Patent: May 19, 2015

(54) PROXY CALCULATION SYSTEM, PROXY CALCULATION METHOD, PROXY CALCULATION REQUESTING APPARATUS, AND PROXY CALCULATION PROGRAM AND RECORDING MEDIUM THEREFOR

(75) Inventors: Go Yamamoto, Tokyo (JP); Tetsutaro Kobayashi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 282 days.

(21) Appl. No.: 13/520,491

(22) PCT Filed: Jan. 11, 2011

(86) PCT No.: PCT/JP2011/050278
§ 371 (c)(1),
(2), (4) Date: Jul. 3, 2012

(87) PCT Pub. No.: WO2011/086992
PCT Pub. Date: Jul. 21, 2011

(65) Prior Publication Data
US 2012/0323981 A1 Dec. 20, 2012

(30) Foreign Application Priority Data

Jan. 12, 2010 (JP) .................................. 2010-003924
Jan. 18, 2010 (JP) .................................. 2010-007835

(51) Int. Cl.
*G06F 7/58* (2006.01)
*H04L 9/30* (2006.01)
*H04L 9/22* (2006.01)

(52) U.S. Cl.
CPC ... *H04L 9/30* (2013.01); *H04L 9/22* (2013.01)

(58) Field of Classification Search
CPC ........... G06F 7/588; G06F 7/58; G06F 7/584; G06F 7/582; H03K 3/84

USPC ......................................................... 708/250
See application file for complete search history.

(56) References Cited

U.S. PATENT DOCUMENTS 6,509,728 B1 * 1/2003 Uchino et al. ............. 324/76.15
2007/0260882 A1 11/2007 Lefranc et al.

FOREIGN PATENT DOCUMENTS

EP 0 381 523 A2 8/1990

OTHER PUBLICATIONS

Blum, M., et al., "Self-Testing/Correcting with Applications to Numerical Problems," ACM, pp. 73 to 83, (1990).

(Continued)

*Primary Examiner* — Tan V. Mai
(74) *Attorney, Agent, or Firm* — Oblon, McClelland, Maier & Neustadt, L.L.P.

(57) ABSTRACT

A function f(x) is calculated with a calculating apparatus that makes a correct calculation with a low probability. Provided that G and H are cyclic groups, f is a function that maps an element x of the group H into the group G, $X_1$ and $X_2$ are random variables whose values are elements of the group G, $x_1$ is a realized value of the random variable $X_1$, and $x_2$ is a realized value of the random variable $X_2$, an integer calculation part calculates integers a' and b' that satisfy a relation a'a+b'b=1 using two natural numbers a and b that are relatively prime. A first randomizable sampler is capable of calculating $f(x)^b x_1$ and designates the calculation result as u. A first exponentiation part calculates $u'=u^a$. A second randomizable sampler is capable of calculating $f(x)^a x_2$ and designates the calculation result as v. A second exponentiation part calculates $v'=v^b$. A determining part determines whether u'=v' or not. A final calculation part calculates $u^{b'}v^{a'}$ in a case where it is determined that u'=v'.

18 Claims, 16 Drawing Sheets

(56) References Cited

OTHER PUBLICATIONS

Boneh, D., et al., "Identity-Based Encryption from the Well Pairing," Crypto, LNCS 2139, pp. 213 to 229, (2001).
T. Yamamoto, T. Kobayashi, "On self-correctors for homomorphic functions," 2010 Nen Symposium on Cryptography and Information Security Gaiyoshu, Jan. 19, 2010, 2D2 Suron Oyo, 2D2-3.
International Search Report mailed Feb. 22, 2011 in No. PCT/JP2011/050278, filed Jan. 11, 2011.
Extended European Search Report issued Dec. 9, 2013 in Patent Application No. 11732862.5.
Manuel Blum et al., "Self-Testing/Correcting with Applications to Numerical Problems", Journal of Computer and System Sciences, vol. 47, No. 3, XP055089183, Dec. 1, 1993, pp. 549-595.
European Communication pursuant to Article 94(3) EPC issued Oct. 28, 2014, in Application No. 11 732 862.5-1870.
The Extended European Search Report issued Oct. 30, 2014, in Application No. Patent No. 14178947.9-1870.
Ueli M. Maurer, et al., "The Diffie-Hellman Protocol", Retrieved from the Internet : URL:ftp//ftp.inf.ethz.ch/pub/crypto/publications/MauWo100c.pdf, XP055147004, Jul. 5, 1999, 32 pages.
Go Yamamoto, et al., "Self-correctors for Cryptographic Modules", Cryptography and Coding, Springer Berlin Heidelberg, XP019170665, Dec. 12, 2011, pp. 132-151.

\* cited by examiner

PROXY CALCULATION SYSTEM, PROXY CALCULATION METHOD, PROXY CALCULATION REQUESTING APPARATUS, AND PROXY CALCULATION PROGRAM AND RECORDING MEDIUM THEREFOR

TECHNICAL FIELD

The present invention relates to a calculation technique by means of a computer. In particular, it relates to a technique of performing a calculation using the result of a calculation performed by another calculator.

BACKGROUND ART

An art for a requesting apparatus to request a calculating apparatus that does not always make a correct calculation to perform a calculation and calculate a function f using the result of the calculation is described in Non-patent literature 1. The self-corrector described in Non-patent literature 1 calculates the function f by requesting the calculating apparatus to perform the calculation a plurality of times and adopting the calculation result by majority decision (see Non-patent literature 1, for example).

PRIOR ART LITERATURE

Non-Patent Literature

Non-patent literature 1: M. Blum, M. Luby, and R. Rubinfeld, "Self-Testing/Correcting with Applications to Numerical Problems", STOC 1990, pp. 73-83.

DISCLOSURE OF THE INVENTION

Problems to be Solved by the Invention

However, in order for the self-corrector described in Non-patent literature 1 to properly operate, the calculating apparatus has to make a correct calculation with a probability equal to or higher than a certain level. There is a problem in that there is no known art of calculating a function f with a calculating apparatus that makes a correct calculation with a low probability.

Means to Solve the Problems

A proxy calculation system according to a first aspect of the present invention comprises: an integer calculation part that calculates integers a' and b' that satisfy a relation $a'a+b'b=1$ using two natural numbers a and b that are relatively prime; a first randomizable sampler that is capable of calculating $f(x)^b x_1$ and designates the calculation result as u; a first exponentiation part that calculates $u'=u^a$; a second randomizable sampler that is capable of calculating $f(x)^a x_2$ and designates the calculation result as v; a second exponentiation part that calculates $v'=v^b$; a determining part that determines whether $u'=v'$ or not; and a final calculation part that calculates $u^{b'}v^{a'}$ in a case where it is determined that $u'=v'$, where G and H are cyclic groups, f is a function that maps an element x of the group H into the group G, $X_1$ and $X_2$ are random variables whose values are elements of the group G, $x_1$ is a realized value of the random variable $X_1$, and $x_2$ is a realized value of the random variable $X_2$.

In a proxy calculation system according to a second aspect of the present invention, a requesting apparatus comprises: a first random number generating part that generates a random number $r_1$ that is an integer equal to or greater than 0 and smaller than $K_G$; a second random number generating part that generates a random number $r_2$ that is an integer equal to or greater than 0 and smaller than $K_H$; a first input information calculating part that calculates first input information $g_1 = \mu_g^{r_1} g$; a second input information calculating part that calculates second input information $h_1 = \mu_h^{r_2}$; a first list information calculating part that calculates $z_1 v^{-r_1 r_2}$ using $z_1 \in F$ received from a calculating apparatus; a first list storage part that stores an information set $(r_2, z_1 v^{-r_1 r_2})$ composed of the random number $r_2$ and the calculated $z_1 v^{-r_1 r_2}$; a third random number generating part that generates a uniform random number $d_1$ that is an integer equal to or greater than 0 and smaller than K; a fourth random number generating part that generates a uniform random number $r_4$ that is an integer equal to or greater than 0 and smaller than $K_G$; a fifth random number generating part that generates a uniform random number $r_5$ that is an integer equal to or greater than 0 and smaller than $K_H$; a third input information calculating part that calculates third input information $g_2 = \mu_g^{r_4} g^{d_1}$; a fourth input information calculating part that calculates fourth input information $h_2 = \mu_h^{r_5}$; a second list information calculating part that calculates $z_2 v^{-r_4 r_5}$ using $z_2 \in F$ received from the calculating apparatus; a second list storage part that stores an information set $(d_1, r_5, z_2 v^{-r_4 r_5})$ composed of $d_1$, $r_5$ and the calculated $z_2 v^{-r_4 r_5}$; a first determining part that determines whether or not the information set read from the first list storage part and the information set read from the second list storage part satisfy a relation $(w_1)^\wedge(t_2 s_2 s_1^{-1}) = w_2$, and substitutes $s_1$ for σ and $w_1$ for v' in a case where the relation is satisfied, where $s_1$ and $w_1$ are a first component and a second component of the information set read from the first list storage part, respectively, and $t_2$, $s_2$ and $w_2$ are a first component, a second component and a third component of the information set read from the second list storage part, respectively; a sixth random number generating part that generates a uniform random number $r_6$ that is an integer equal to or greater than 0 and smaller than $K_G$; a seventh random number generating part that generates a uniform random number $r_7$ that is an integer equal to or greater than 0 and smaller than $K_H$; a fifth input information calculating part that calculates fifth input information $g_3 = g^{r_6}$; a sixth input information calculating part that calculates sixth input information $h_3 = \mu_h^{r_7} h$; a third list information calculating part that calculates $z_3 v'^{-r_6 r_7}$ using $z_3 \in F$ received from the calculating apparatus; a third list storage part that stores an information set $(r_6, z_3 v'^{-r_6 r_7})$ composed of $r_6$ and the calculated $z_3 v'^{-r_6 r_7}$; an eighth random number generating part that generates a uniform random number $d_2$ that is an integer equal to or greater than 0 and smaller than K; a ninth random number generating part that generates a uniform random number $r_9$ that is an integer equal to or greater than 0 and smaller than $K_G$; a tenth random number generating part that generates a uniform random number $r_{10}$ that is an integer equal to or greater than 0 and smaller than $K_H$; a seventh input information calculating part that calculates seventh input information $g_4 = \mu_g^{r_9}$; an eighth input information calculating part that calculates eighth input information $h_4 = \mu_h^{r_{10}} h^{d_2}$; a fourth list information calculating part that calculates $z_4 v'^{-r_9 r_{10}}$ using $z_4 \in F$ received from the calculating apparatus; a fourth list storage part that stores an information set $(d_2, r_9, z_4 v'^{-r_9 r_{10}})$ composed of $d_2$, $r_9$ and the calculated $z_4 v'^{-r_9 r_{10}}$; and a second determining part that determines whether or not the information set read from the third list storage part and the information set read from the fourth list storage part satisfy a relation $(w_3)^\wedge(t_4 s_4 s_3^{-1}) = w_4$, and outputs $(w_3)^\wedge(s_3^{-1})$ in a case where the relation is satisfied, where $s_3$ and $w_3$ are a first component and a second component of the information set read from the third list storage part, respectively, and $t_4$, $s_4$ and $w_4$ are a first component, a second component and a third component of the information set read from the fourth list storage part, respectively, where G; H and F are cyclic groups, a map $\theta$: G×H→F is a bi-homomorphism, g is an element of the group G, h is an element of the group H, $K_G$ is an order of the group G, $K_H$ is an order of the group H, $\mu_g$ is a generator of the group G, $\mu_h$ is a generator of the group H, $v=\theta(\mu_g, \mu_g)$, k is a security parameter that is a natural number, and $K=2^k$. The calculating apparatus comprises: a first output information calculating part that is capable of calculating $\theta(g_1, h_1)$ using $g_1$ and $h_1$ received from the requesting apparatus and outputs the calculation result as $z_1$; a second output information calculating part that is capable of calculating $\theta(g_2, h_2)$ using $g_2$ and $h_2$ received from the requesting apparatus and outputs the calculation result as $z_2$; a third output information calculating part that is capable of calculating $\theta(g_3, h_3)$ using $g_3$ and $h_3$ received from the requesting apparatus and outputs the calculation result as $z_3$; and a fourth output information calculating part that is capable of calculating $\theta(g_4, h_4)$ using $g_4$ and $h_4$ received from the requesting apparatus and outputs the calculation result as $z_4$.

Effects of the Invention

A calculating apparatus that makes a correct calculation with a low probability can be used to calculate a function f.

DETAILED DESCRIPTION OF THE EMBODIMENTS

In the following, proxy calculation systems and proxy calculation methods according to embodiments of the present invention will be described in detail.

According to a first and a second embodiment, a function f(x) is calculated using the result of a calculation performed by a calculating apparatus 2 in response to a request from a requesting apparatus 1.

First Embodiment

Figure 1:
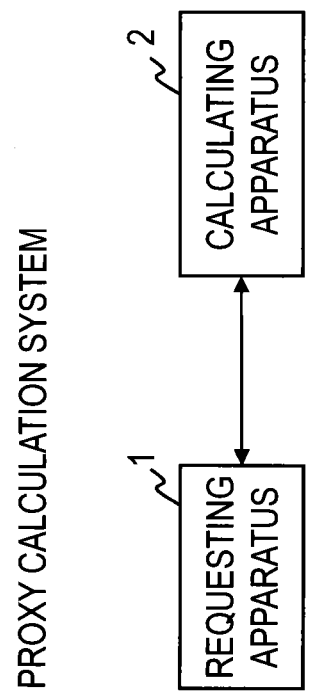
FIG. 1 is a functional block diagram showing an example of a proxy calculation system according to first to third embodiments.

A proxy calculation system according to the first embodiment comprises the requesting apparatus 1 and the calculating apparatus 2 as illustrated in FIG. 1, and calculates the function f(x) using the result of a calculation performed by the calculating apparatus 2 in response to a request from the requesting apparatus 1.

Figure 2:
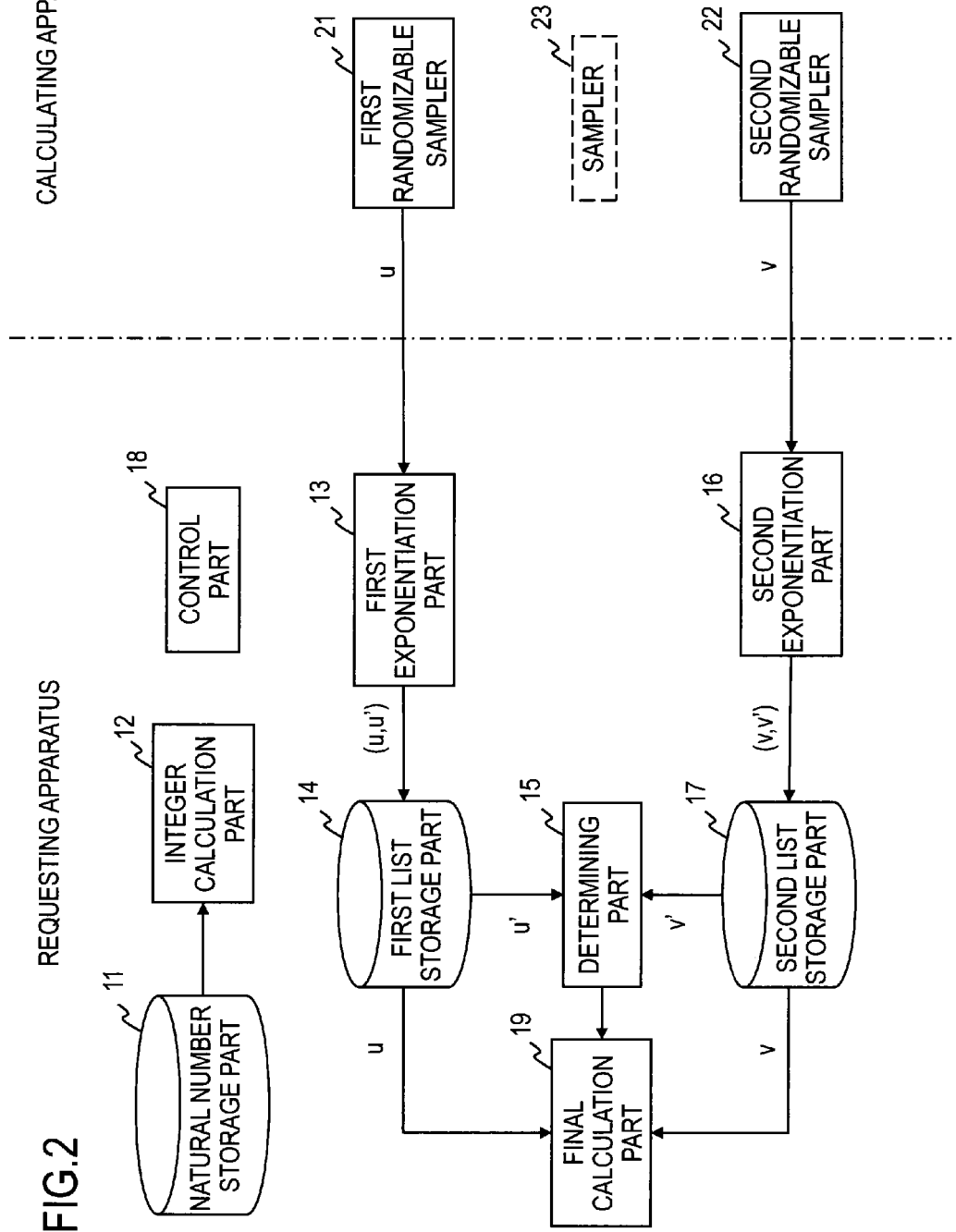
FIG. 2 is a functional block diagram showing an example of a requesting apparatus and a calculating apparatus according to the first to third embodiments.

As shown in FIG. 2, the requesting apparatus 1 comprises a natural number storage part 11, an integer calculation part 12, a first exponentiation part 13, a first list storage part 14, a determining part 15, a second exponentiation part 16, a second list storage part 17, a control part 18, and a final calculation part 19, for example. The calculating apparatus 2 comprises a first randomizable sampler 21 and a second randomizable sampler 22, for example. According to the first embodiment, the first randomizable sampler 21 and the second randomizable sampler 22 correspond to the calculating apparatus 2.

It is supposed that G and H denote cyclic groups, the function f: H→G is a function that maps an element x of the group H into the group G; $\mu_g$ and $\mu_h$ denote the generators of the groups G and H, respectively, $X_1$ and $X_2$ denote random variables whose values are elements of the group G, $x_1$ denotes a realized value of the random variable $X_1$, and $x_2$ denotes a realized value of the random variable $X_2$.

It is assumed that the natural number storage part 11 stores a plurality of pairs (a, b) of natural numbers a and b that are relatively prime. Provided that I denotes a set of pairs of relatively prime natural numbers smaller than the order of the group G, it can be considered that the natural number storage part 11 stores sets (a, b) of natural numbers a and b that correspond to a subset S of the set I.

The integer calculation part 12 randomly reads in one set (a, b) of natural numbers from the plurality of sets (a, b) of natural numbers stored in the natural number storage part 11, and calculates integers a' and b' that satisfy a relation a'a+b'b=1 using the read-in set (a, b) of natural numbers (Step S1). Since the natural numbers a and b are relatively prime, the integers a' and b' that satisfy the relation a'a+b'b=1 exist without fail. Information on the set (a, b) of natural numbers is transmitted to the first exponentiation part 13, the second exponentiation part 16, the first randomizable sampler 21 and the second randomizable sampler 22. Information on the set (a', b') of integers is transmitted to the final calculation part 19.

The control part 18 assumes that t=1 (Step S2).

The first randomizable sampler 21 is capable of calculating $f(x)^b x_1$ and performs the calculation using x and b, and the calculation result is denoted by u (Step S3). The calculation result u is transmitted to the first exponentiation part 13.

In this application, the expression "be capable of calculating" means that a calculation is possible with a probability equal to or higher than a non-negligible probability. The expression "non-negligible probability" means a probability equal to or higher than 1/F(k), where F(k) denotes a polynomial that is a monotone function of a security parameter k in a broad sense.

To calculate $f(x)^b x_1$ means to calculate the value of the formula defined as $f(x)^b x_1$. Any calculation process can be used as far as the value of the formula $f(x)^b x_1$ can be finally calculated. The same holds true for calculation of any other formulas found in this application.

The first exponentiation part 13 calculates $u'=u^a$ (Step S4). The set (u, u') of the calculation result u and u' calculated based on the calculation result is stored in the first list storage part 14.

The determining part 15 determines whether or not there are values u' and v' that satisfy a relation u'=v' in the sets (u, u') stored in the first list storage part 14 and sets (v, v') stored in the second list storage part 17 (Step S5). If the second list storage part 17 stores no set (v, v'), the processing of Step S5 is omitted, and the process proceeds to the processing of the following Step S6. If there are values that satisfy the relation u'=v', the process proceeds to Step S12. If there are no values that satisfy the relation u'=v', the process proceeds to Step S6.

The second randomizable sampler 22 is capable of calculating $f(x)^a x_2$ and performs the calculation using x and a, and the calculation result is denoted by v (Step S6). The calculation result v is transmitted to the second exponentiation part 16.

The second exponentiation part 16 calculates $v'=v^b$ (Step S7). The set (v, v') of the calculation result v and v' calculated based on the calculation result is stored in the second list storage part 17.

The determining part 15 determines whether or not there are values u' and v' that satisfy the relation u'=v' in the sets (u, u') stored in the first list storage part 14 and the sets (v, v') stored in the second list storage part 17 (Step S8). If there are values that satisfy the relation u'=v', the process proceeds to Step S12. If there are no values that satisfy the relation u'=v', the process proceeds to Step S9.

The control part 18 determines whether or not t=T (Step S9). T denotes a predetermined natural number. If t=T, information that the calculation is impossible, such as a symbol "⊥", is output (Step S11), and the process ends. If t≠T, the control part 18 increments t by 1 (t=t+1) (Step S10), and the process returns to Step S3.

The information that the calculation is impossible (the symbol "⊥" in this example) means that the calculation reliability of the calculating apparatus 2 is lower than a reference determined by T. In other words, it means that the T repeated calculations have failed.

When it is determined that there are values u' and v' that satisfy the relation u'=v', the final calculation part 19 calculates $u^{b'}$ and $v^{a'}$ using u and v corresponding to the values u' and v' and outputs the values $u^{b'}$ and $v^{a'}$ (step S12). The calculated $u^{b'}$ and $v^{a'}$ satisfy a relation $u^{b'}v^{a'}=f(x)$. A reason why the relation $u^{b'}v^{a'}=f(x)$ holds will be described below.

<<Reason why $u^{b'}v^{a'}=f(x)$ Holds>>

It is assumed that X denotes a random variable whose value is an element of the group G. An entity in a calculating apparatus that extracts a sample x' according to a random variable R and transmits back wx' where w∈G in response to each request is referred to as a sampler with an error X for an element w.

An entity in a calculating apparatus that extracts a sample x' according to a random variable X and transmits back $w^a x'$ where w∈G in response to each input of a natural number a is referred to as a randomizable sampler with an error X for an element w. The randomizable sample used on the assumption that a=1 serves as a sampler.

Configured to receive x and output f(x), the proxy calculation system according to this embodiment uses the first randomizable sampler 21 with an error $X_1$ for f(x) and the second randomizable sampler 22 with an error $X_2$ for f(x).

The inventor has found that the relation u'=v', that is, the relation $u^a=v^b$ is highly likely to hold when the first randomizable sampler 21 correctly calculates $u=f(x)^b x_1$, the second randomizable sampler 22 correctly calculates $v=f(x)^a x_2$, and $x_1$ and $x_2$ are unit elements $e_g$ of the group G. The proof is omitted herein.

When the first randomizable sampler 21 correctly calculates $u=f(x)^b x_1$, the second randomizable sampler 22 correctly calculates $v=f(x)^a x_2$, and $x_1$ and $x_2$ are unit elements $e_g$ of the group G, the following relation holds:

$$u^{b'}v^{a'}=(f(x)^b x_1)^{b'}(f(x)^b e_g)^{b'}=(f(x)^b e_g)^{b'}(f(x)^a e_g)^{a'}= f(x)^{bb'}e_g^{b'}f(x)^{aa'}e_g^{a'}=f(x)^{(bb'+aa')}=f(x).$$

A function $\pi_i$ for each i (=1, 2) is defined as $\pi_i(q_1, q_2)=q_i$, where (q1, q2)∈I. Besides, it is assumed that L=min(#$\pi_1$(S), #$\pi_2$(S)). The symbol #• denotes the order of a group •. When the group G is a cyclic group, or the order of the group G is difficult to calculate, the probability of the output of the proxy calculation system described above not being f(x) when the output is not the symbol "⊥" is expected to be of the order, at the most, of $T^2 L/\#S$ with a negligible error. If L/#S is negligible, and T is of the order of the polynomial order, the proxy calculation system outputs f(x) with an overwhelmingly high probability.

An example of the value of S that makes L/#S negligible is S={(1, d)|d∈[2, |G|−1]}.

As shown by a dashed line in FIG. 2, the calculating apparatus 2 may further comprises a sampler 23. The sampler 23 is capable of calculating $f(x)x_3$, where $X_3$ is a random variable whose value is an element of the group G, and $x_3$ denotes a realized value of the random variable $X_3$, and performs the calculation instead of the second randomizable sampler 22 and designates the calculation result as v described above when a=1, and performs the calculation instead of the first randomizable sampler 21 and designates the calculation result as u described above when b=1.

In general, the calculation amount of the sampler is smaller than that of the randomizable sampler. If a=1, and b=1, the calculation amount of the calculating apparatus 2 can be reduced by using the sampler 23 for calculation instead of the first randomizable sampler 21 and the second randomizable sampler 22.

Second Embodiment

The second embodiment relates to another specific example of the first randomizable sampler 21 and the second randomizable sampler 22 of the proxy calculation system, or in other words, another specific example of Steps S3 and S6. The following description will be mainly focused on differences from the first embodiment, and redundant description of common things will be omitted.

Figure 3:
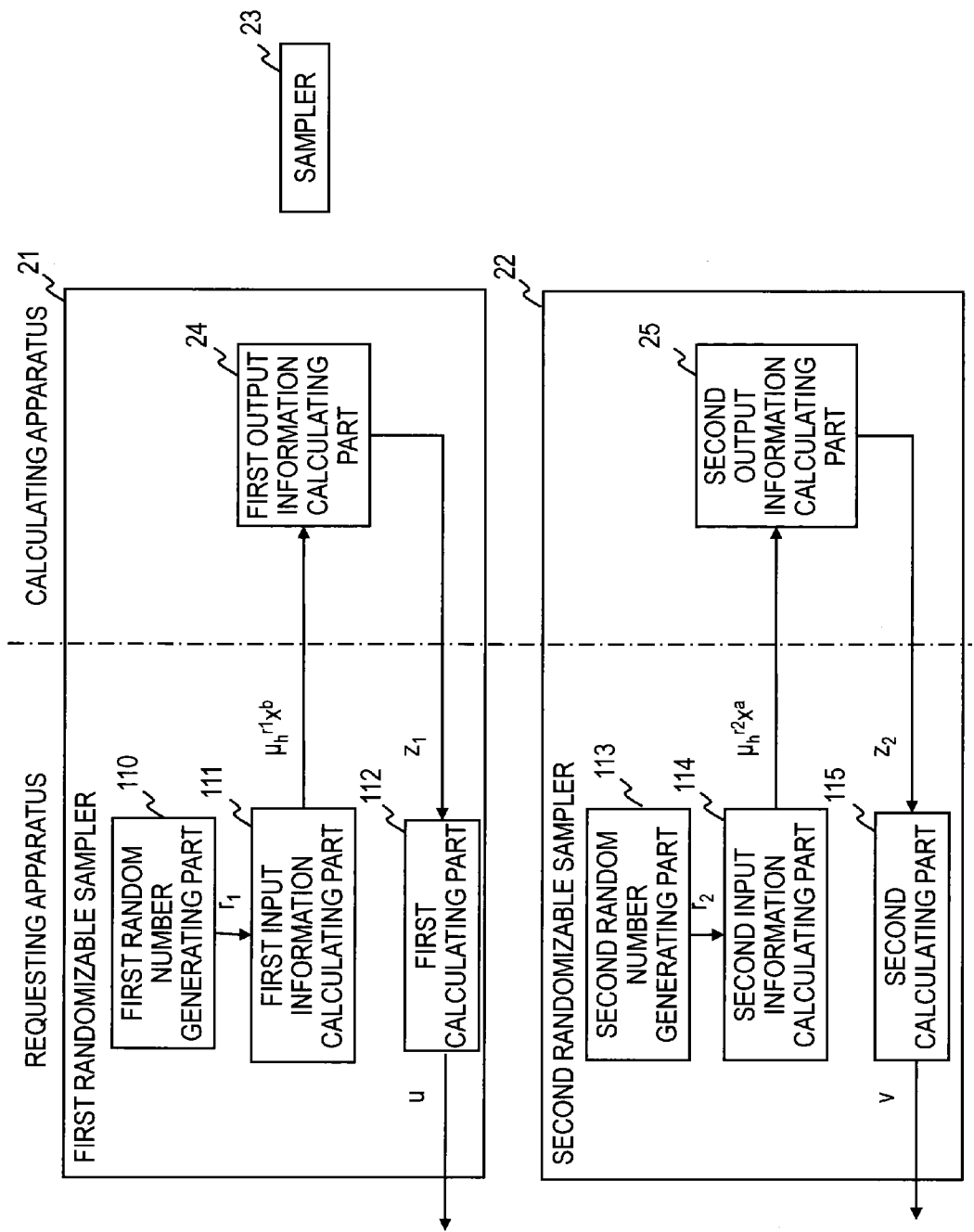
FIG. 3 is a functional block diagram showing an example of a sampler according to the first to third embodiments.

As shown in FIG. 3, the first randomizable sampler 21 according to the second embodiment comprises a first random number generating part 110, a first input information calculating part 111, a first output information calculating part 24, and a first calculating part 112, for example. As shown in FIG. 3, the second randomizable sampler 22 according to the second embodiment comprises a second random number generating part 113, a second input information calculating part 114, a second output information calculating part 25, and a second calculating part 115, for example.

According to the second embodiment, the first random number generating part 110, the first input information calculating part 111, the first calculating part 112, the second random number generating part 113, the second input information calculating part 114 and the second calculating part 115 are included in the requesting apparatus 1. The first output information calculating part 24 and the second output information calculating part 25 are included in the calculating apparatus 2. According to the second embodiment, the first output information calculating part 24 and the second output information calculating part 25 correspond to the calculating apparatus 2.

According to the second embodiment, the function f is a homomorphism. The generator of the group H is denoted by $\mu_h$, the order of the group H is denoted by $K_H$, and $v=f(\mu_h)$.

Figure 7:
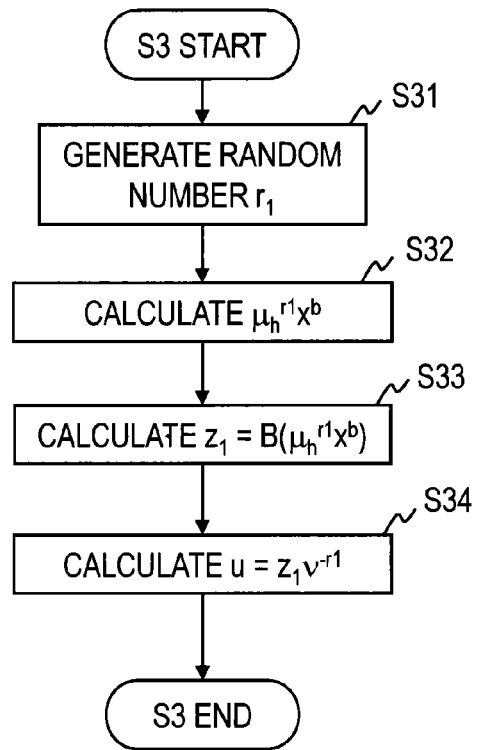
FIG. 7 is a flowchart showing an example of Step S3.

Step S3 is composed of Steps S31 to S34 illustrated in FIG. 7.

The first random number generating part 110 generates a uniform random number $r_1$ that is an integer equal to or greater than 0 and smaller than $K_H$ (Step S31). The generated random number $r_1$ is transmitted to the first input information calculating part 111.

The first input information calculating part 111 calculates first input information $\mu_h^{r_1} x^b$ (Step S32). The calculated first input information $\mu_h^{r_1} x^b$ is transmitted to the first output information calculating part 24.

The first output information calculating part 24 performs a calculation using the first input information $\mu_h^{r_1} x^b$ and designates the calculation result as first output information, $z_1$ (Step S33). The calculated first output information $z_1$ is transmitted to the first calculating part 112.

The first output information calculating part 24 is capable of calculating $f(\mu_h^{r_1} x^b)$. The result of the calculation performed by the first output information calculating part 24 may be or may not be $f(\mu_h^{r_1} x^b)$.

The superscript "$r_1$" of $\mu_h$ means $r_1$. In this way, in this application, in an expression $\alpha^{\beta \gamma}$ where $\alpha$ denotes a first character, $\beta$ denotes a second character and $\gamma$ denotes a numeral, $\beta \gamma$ means $\beta_\gamma$, that is, $\gamma$ is a subscript of $\beta$.

The first calculating part 112 calculates $z_1 v^{-r_1}$ and designates the calculation result as u (Step S34). The calculation result u is transmitted to the first exponentiation part 13. Note that $u=z_1 v^{-r_1}=f(x)^b x_1$. That is, $z_1 v^{-r_1}$ is a randomizable sampler with an error $X_1$ for f(x). A reason therefor will be described later.

Figure 8:
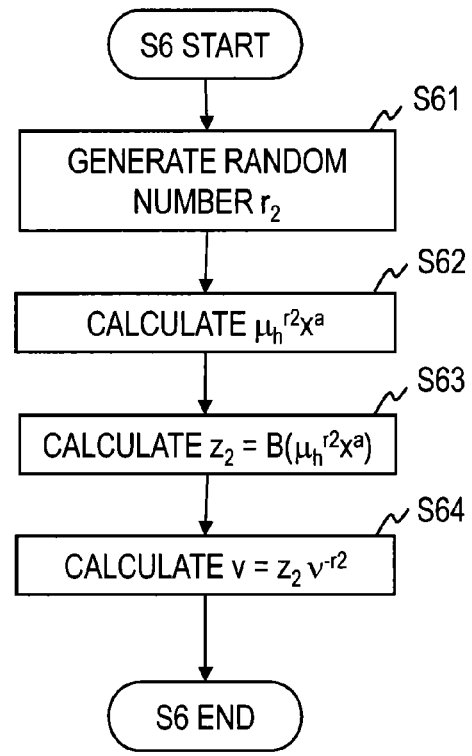
FIG. 8 is a flowchart showing an example of Step S6.

Step S6 is composed of Steps S61 to S64 illustrated in FIG. 8.

The second random number generating part 113 generates a uniform random number $r_2$ that is an integer equal to or greater than 0 and smaller than $K_H$ (Step S61). The generated random number $r_2$ is transmitted to the second input information calculating part 114.

The second input information calculating part 114 calculates second input information $\mu_h^{r_2} x^a$ (Step S62). The calculated second input information $\mu_h^{r_2} x^a$ is transmitted to the second output information calculating part 25.

The second output information calculating part 25 performs a calculation using the second input information $\mu_h^{r_2} x^a$ and designates the calculation result as second output information $z_2$ (Step S63). The calculated second output information $z_2$ is transmitted to the second calculating part 115.

The second output information calculating part 25 is capable of calculating $f(\mu_h^{r_2} x^a)$. The result of the calculation performed by the second output information calculating part 25 may be or may not be $f(\mu_h^{r_2} x^a)$.

The second calculating part 115 calculates $z_2 v^{-r_2}$ and designates the calculation result as v (Step S64). The calculation result v is transmitted to the second exponentiation part 16. Note that $v=z_2|^{-r_2}=f(x)^a x_2$. That is, $z_2 v^{-r_2}$ is a randomizable sampler with an error $X_2$ for f(x). A reason therefor will be described later.

In the second embodiment, if a=1, and b=1, the calculation amount can be reduced by using the sampler 23 for calculation of the value of u or v instead of the first randomizable sampler 21 and the second randomizable sampler 22.

Figure 4:
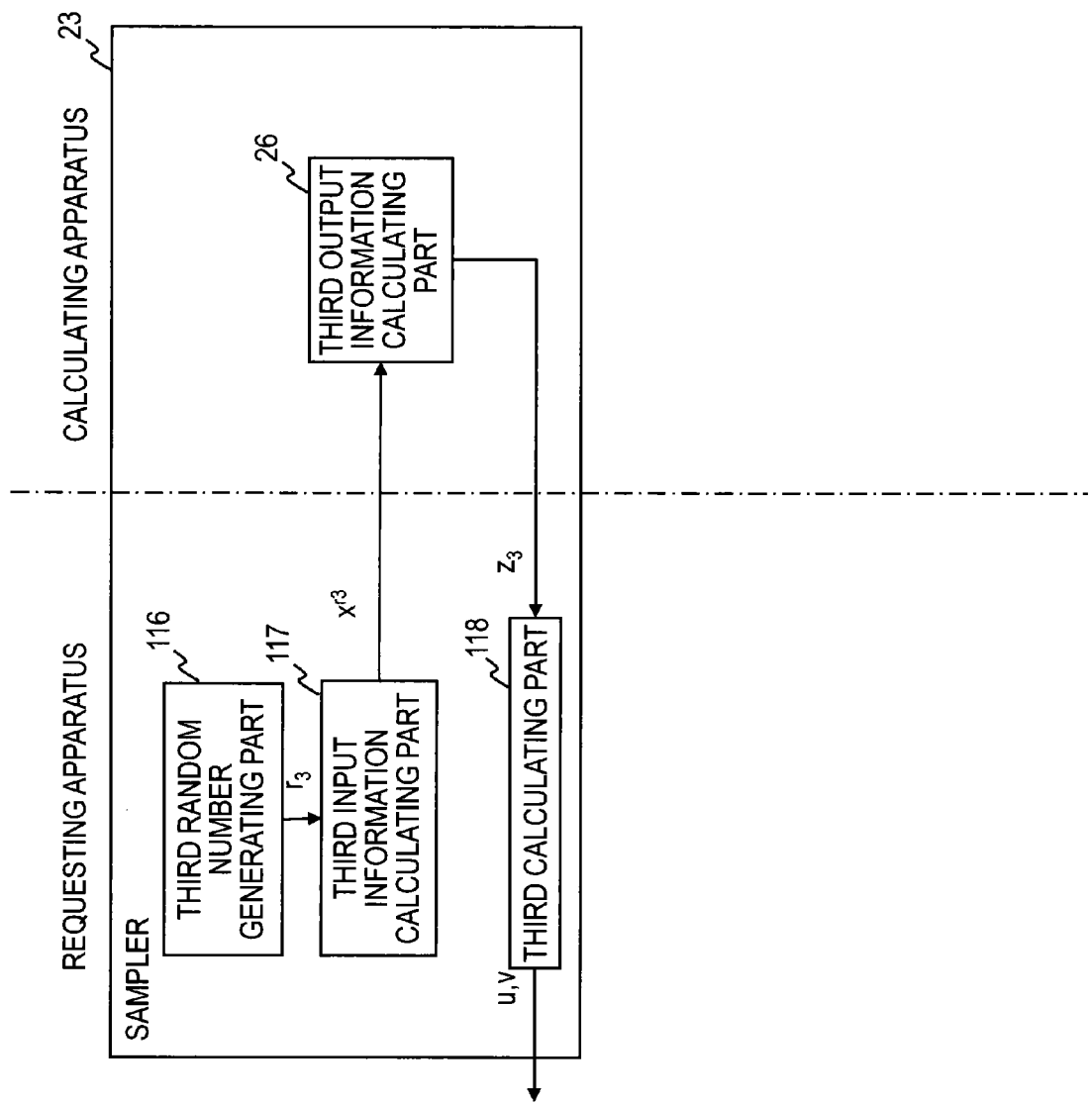
FIG. 4 is a functional block diagram showing an example of a first randomizable sampler and a second randomizable sampler according to the first to third embodiments.

As shown in FIG. 4, the sampler 23 according to the second embodiment comprises a third random number generating part 116, a third input information calculating part 117, a third output information calculating part 26 and a third calculating part 118, for example. The third random number generating part 116, the third input information calculating part 117 and the third calculating part 118 are included in the requesting apparatus 1. The third output information calculating part 26 is included in the calculating apparatus 2.

When a=1, and b=1, the sampler 23 performs the following processings instead of the first randomizable sampler 21 and the second randomizable sampler 22.

The third random number generating part 116 generates a random number $r_3$ that is an integer equal to or greater than 0 and smaller than $K_H$. The generated random number $r_3$ is transmitted to the third input information calculating part 117.

The third input information calculating part 117 calculates third input information $x^{r_3}$. The calculated third input information $x^{r_3}$ is transmitted to the third output information calculating part 26.

The third output information calculating part 26 performs a calculation using the third input information $x^{r_3}$ and designates the calculation result as third output information $z_3$. The calculated third output information $z_3$ is transmitted to the third calculating part 118.

The third output information calculating part 26 is capable of calculating $f(x^{r_3})$. The result of the calculation performed by the third output information calculating part 26 may be or may not be $f(x^{r_3})$.

The third calculating part 118 calculates $z_3^{143}$ and designates the calculation result as v when a=1 or as u when b=1. The calculation result v is transmitted to the second exponentiation part 16. The calculation result u is transmitted to the first exponentiation part 13. Note that $u=v=z_3^{1/r_3}=f(x)x_3$. That is, $z_3^{1/r_3}$ is a sampler with an error $X_3$ for f(x). A reason therefor will be described later.

When it is difficult to calculate $z_3^{1/r_3}$, that is, a root of $z_3$, u and/or v can be calculated in the following manner. The third calculating part 118 stores in a storage part (not shown) a sequence of sets $(\alpha_1, \beta_1), (\alpha_2, \beta_2), \ldots, (\alpha_m, \beta_m)$ of the random numbers $r_3$ and the values $z_3$ calculated based on the random numbers $r_3$, where m denotes a natural number. When the least common multiple of $\alpha_1, \alpha_2, \ldots, \alpha_m$ is 1, the third calculating part 118 can calculate $\gamma_1, \gamma_2, \ldots$ and $\gamma_m$ that satisfy a relation $\gamma_1 \alpha_1 + \gamma_2 \alpha_2 + \ldots + \gamma_m \alpha_m = 1$, where $\gamma_1, \gamma_2, \ldots$ and $\gamma_m$ denote integers, calculate $\Pi_{i=1}^{m}\beta_i^{\gamma i}=\beta_1^{\gamma 1}\beta_2^{\gamma 2}\ldots\beta_m^{\gamma m}$, and designate the calculation result as u and/or v.

Since information on x scrambled with the random numbers $r_1$, $r_2$ and $r_3$ in this way is transmitted to the calculating apparatus 2, the value $x \in H$ that is the target of the calculation of the value of the function f can be concealed from the calculating apparatus 2 and a third party intercepting the communication between the requesting apparatus 1 and the calculating apparatus 2.

<<Reason why $z_1 v^{-r1}$ and $z_2 v^{-r2}$ are Randomizable Samplers with Errors $X_1$ and $X_2$ for f(x), Respectively>>

It is supposed that c denotes a natural number, R and R' denote random numbers, the result of the calculation performed by the calculating apparatus 2 using $\mu_h^R x^c$ is denoted as $B(\mu_h^R x^c$ that is, $z=B(\mu_h^R x^c)$ provided that z is the calculation result returned to the requesting apparatus 1 from the calculating apparatus 2), and the random variable X whose value is an element of the group G is defined as $X=B(\mu_h^{R'})f(\mu_h^{R'})^{-1}$.

Then, $zv^{-R}=B(\mu_h^R x^c)f(\mu_h)^{-R}=Xf(\mu_h^R x^c)f(\mu_h)^{-R}=Xf(\mu_h)^R f(\mu_h)^{-R}=f(x)^c X$. That is, $zv^{-R}$ is a randomizable sampler with an error X for f(x).

In development of the formula described above, properties are used that $X=B(\mu_h^{R'})f(\mu_h^{R'})^{-1}=B(\mu_h^R x^c)^{-1}$ and $B(\mu_h^R x^c)=xf(\mu_h^R x^c)$. These properties are based on the facts that the function f is a homomorphism, and R and R' are random numbers.

Therefore, taking into consideration the facts that a and b are natural numbers, and $r_1$ and $r_2$ are random numbers, $z_1 v^{-r1}$ and $z_2 v^{-r2}$ are randomizable samplers with errors $X_1$ and $X_2$ for f(x), respectively.

<<Reason why $z_3^{1/r3}$ is Sampler With Error $X_3$ for f(x)>>

It is supposed that R and R' denote random numbers, the result of the calculation performed by the calculating apparatus 2 using $x^R$ is denoted as $B(x^R)$ (that is, $z=B(x^R)$ provided that z is the calculation result returned to the requesting apparatus 1 from the calculating apparatus 2), and the random variable X whose value is an element of the group G is defined as $X=B(x^R)^{1/R}f(x)^{-1}$.

Then, $z^{1/R}=B(x^R)^{1/R}=Xf(x)=f(x)X$. That is, $z^{1/R}$ is a sampler with an error X for f(x).

In development of the formula described above, properties are used that $X=B(x^R)^{1/R}f(x^R)^{-1}$ and $B(x^R)^{1/R}=Xf(x^R)$. These properties are based on the fact that R and R' are random numbers.

Therefore, taking into consideration the fact that $r_3$ is a random number, $Z^{1/R}$ is a randomizable sampler with an error $X_3$ for f(x).

Third Embodiment

A third embodiment relates to another specific example of the first randomizable sampler 21 and the second randomizable sampler 22 of the proxy calculation system, or in other words, another specific example of Steps S3 and S6. More specifically, it relates to a specific example of the first randomizable sampler 21 and the second randomizable sampler 22 in a case where H=G×G and the function f is a decryption function for an ElGamal encryption, that is, $f(c_1, c_2)=c_1 c_2^{-s}$ for a secret key s and a cipher text $(c_1, c_2)$. The following description will be mainly focused on differences from the first embodiment, and redundant description of common things will be omitted.

Figure 5:
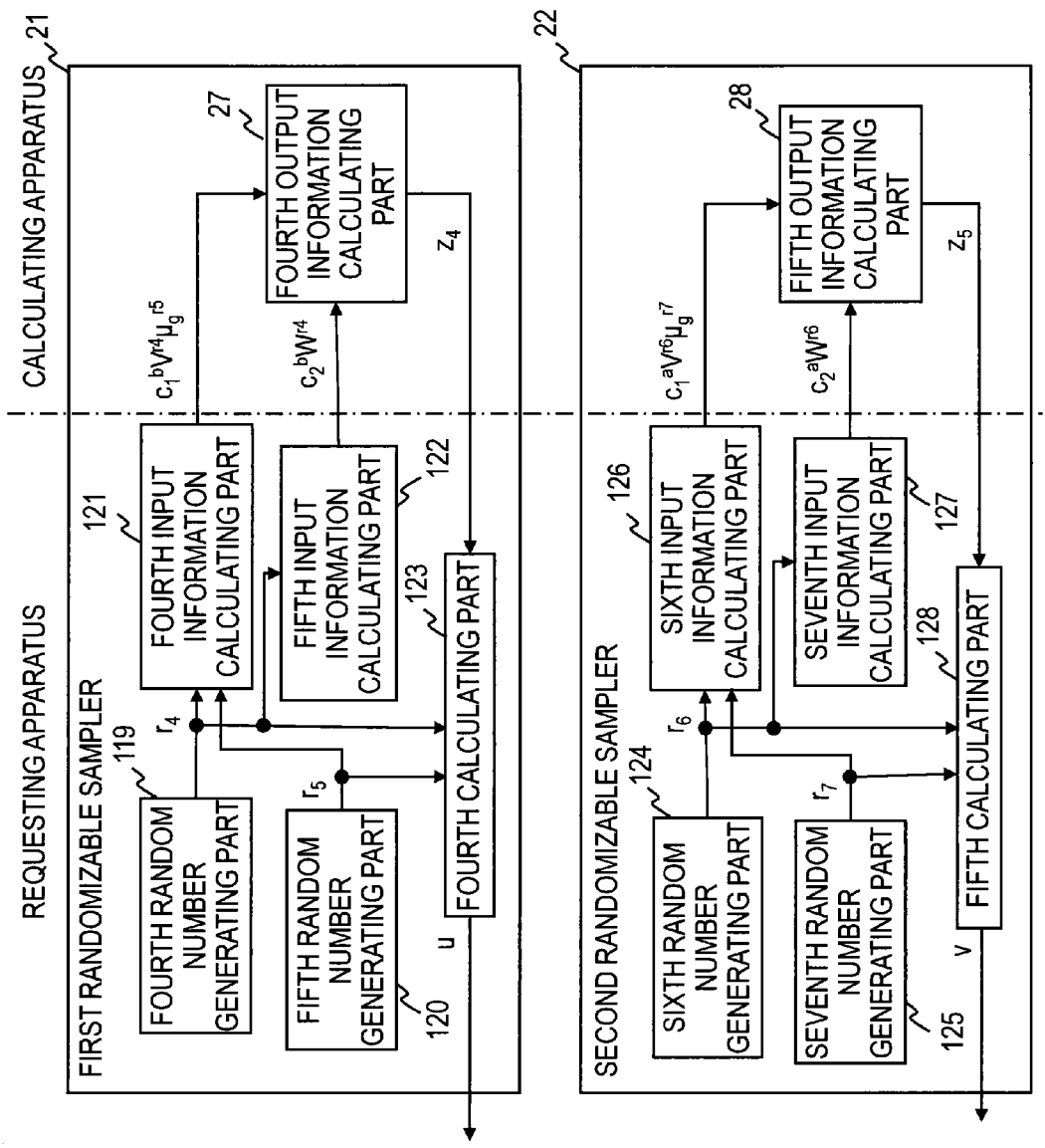
FIG. 5 is a functional block diagram showing another example of the first randomizable sampler and the second randomizable sampler according to the first to third embodiments.
Figure 6:
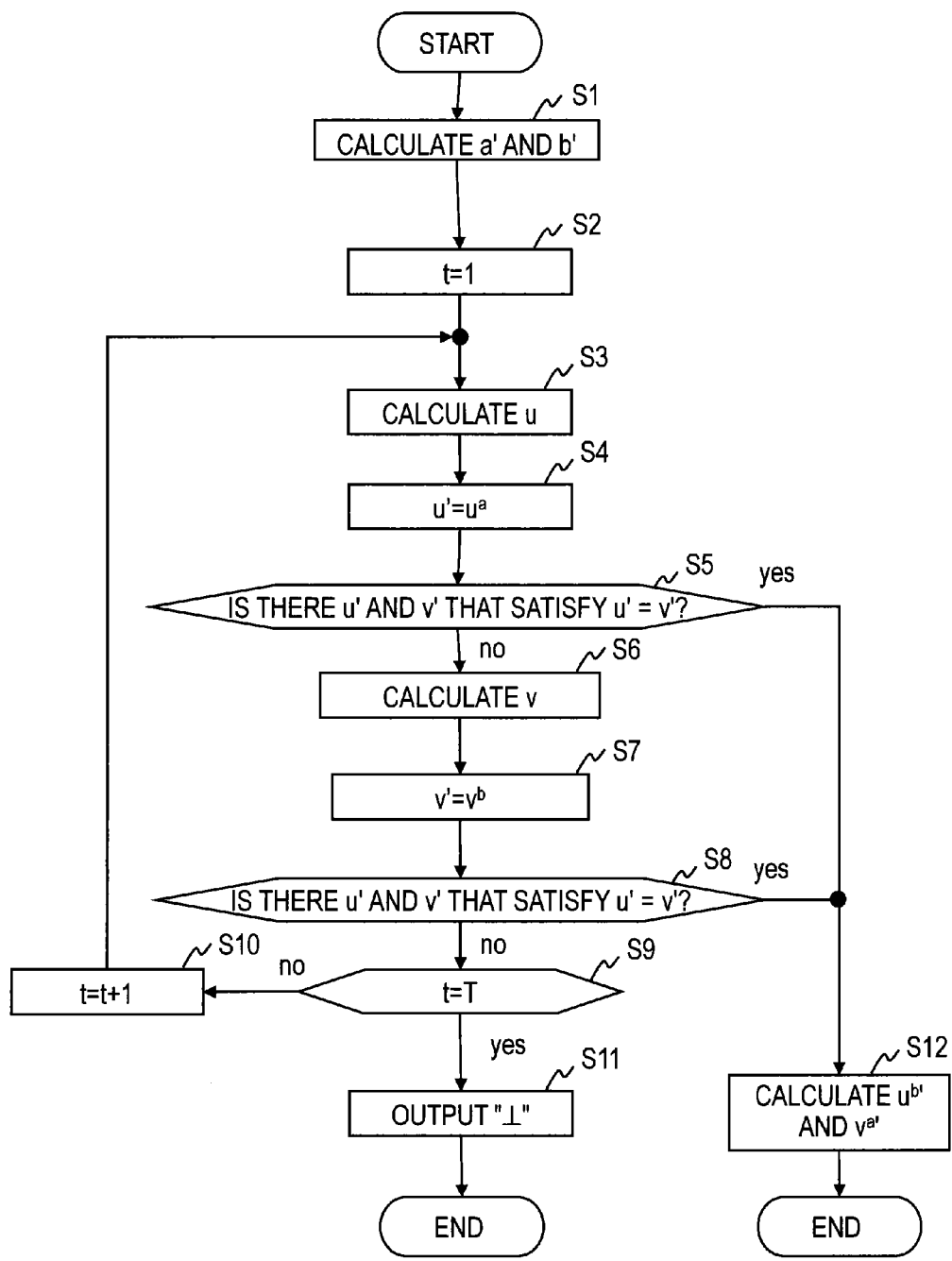
FIG. 6 is a flowchart showing an example of a proxy calculation method according to the first to third embodiments.

As shown in FIG. 5, the first randomizable sampler 21 according to the third embodiment comprises a fourth random number generating part 119, a fifth random number generating part 120, a fourth input information calculating part 121, a fifth input information calculating part 122, a fourth output information calculating part 27, and a fourth calculating part 123, for example. As shown in FIG. 5, the second randomizable sampler 22 comprises a sixth random number generating part 124, a seventh random number generating part 125, a sixth input information calculating part 126, a seventh input information calculating part 127, a fifth output information calculating part 28, and a fifth calculating part 128, for example.

The fourth random number generating part 119, the fifth random number generating part 120, the fourth input information calculating part 121, the fifth input information calculating part 122, the fourth calculating part 123, the sixth random number generating part 124, the seventh random number generating part 125, the sixth input information calculating part 126, the seventh input information calculating part 127 and the fifth calculating part 128 are included in the requesting apparatus 1. According to the third embodiment, the fourth output information calculating part 27 and the fifth output information calculating part 28 correspond to the calculating apparatus 2.

According to the third embodiment, it is supposed that $x=(c_1, c_2)$, $f(c_1, c_2)$ is a homomorphism from a direct product group G×G to the group G, the generator of the group G is $\mu_g$, the order of the group G is $K_G$, and the requesting apparatus 1 and the calculating apparatus 2 previously have knowledge of a cipher text $(V, W) \in H$ and a decrypted text $f(V, W)=Y \in G$ resulting from decryption of the cipher text for a same secret key s.

Figure 9:
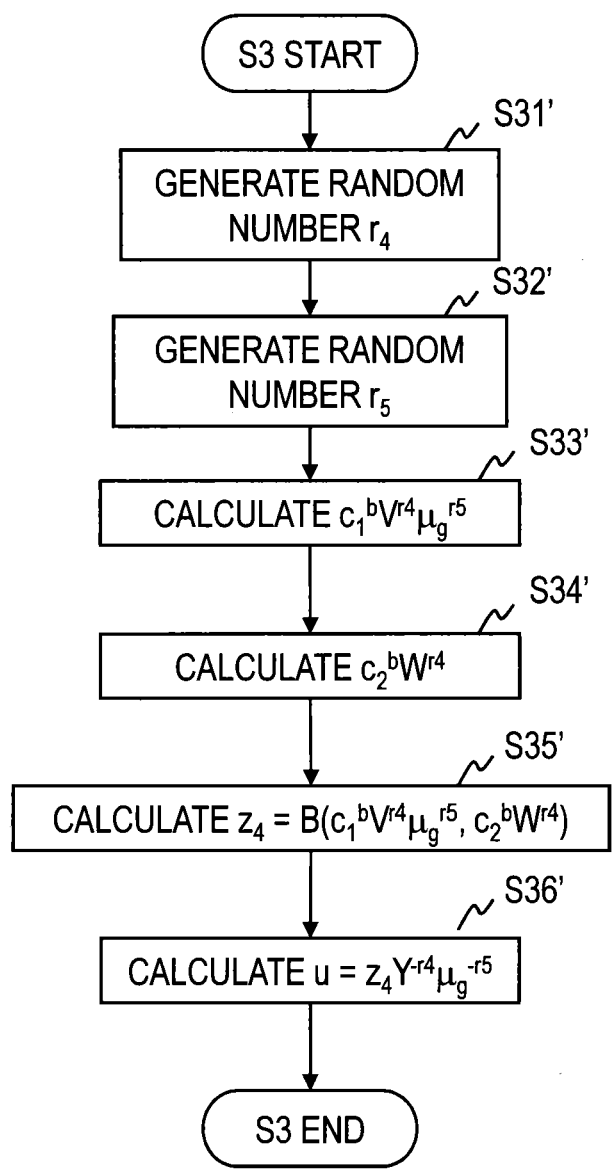
FIG. 9 is a flowchart showing another example of Step S3.

According to the third embodiment, Step S3 is composed of Steps S31' to S36' illustrated in FIG. 9.

The fourth random number generating part 119 generates a uniform random number $r_4$ that is an integer equal to or greater than 0 and smaller than $K_G$ (Step S31'). The generated random number $r_4$ is transmitted to the fourth input information calculating part 121, the fifth input information calculating part 122 and the fourth calculating part 123.

The fifth random number generating part 120 generates a uniform random number $r_5$ that is an integer equal to or greater than 0 and smaller than $K_G$ (Step S32'). The generated random number $r_5$ is transmitted to the fourth input information calculating part 121 and the fourth calculating part 123.

The fourth input information calculating part 121 calculates fourth input information $c_1^b V^{r4} \mu_g^{r5}$ (Step S33'). The calculated fourth input information $c_1^b V^{r4} \mu_g^{r5}$ is transmitted to the fourth output information calculating part 27.

The fifth input information calculating part 122 calculates fifth input information $c_2^b W^{r4}$ (Step S34'). The calculated fifth input information $c_2^b W^{r4}$ is transmitted to the fourth output information calculating part 27.

The fourth output information calculating part 27 performs a calculation using the fourth input information $c_1^b V^{r4} \mu_g^{r5}$ and the fifth input information $c_2^b W^{r4}$ and designates the calculation result as fourth output information $z_4$ (Step S35').

The fourth output information calculating part 27 is capable of calculating $f(c_1^b V^{r4} \mu_g^{r5}, c_2^b W^{r4})$. The result of the calculation performed by the fourth output information calculating part 27 may be or may not be $f(c_1^b \mu_g^{r5}, c_2^b W^{r4})$.

The fourth calculating part 123 calculates $z_4 Y^{-r4} \mu_g^{-r5}$ and designates the calculation result as u (Step S36'). The calculation result u is transmitted to the first exponentiation part 13. Note that $u=z_4 Y^{-r4} \mu_g^{-r5}=f(c_1, c_2)^b x_1$. That is, $z_4 Y^{-r4} \mu_g^{-r5}$ is a randomizable sampler with an error $X_1$ for $f(c_1, c_2)$. A reason therefor will be described later.

Figure 10:
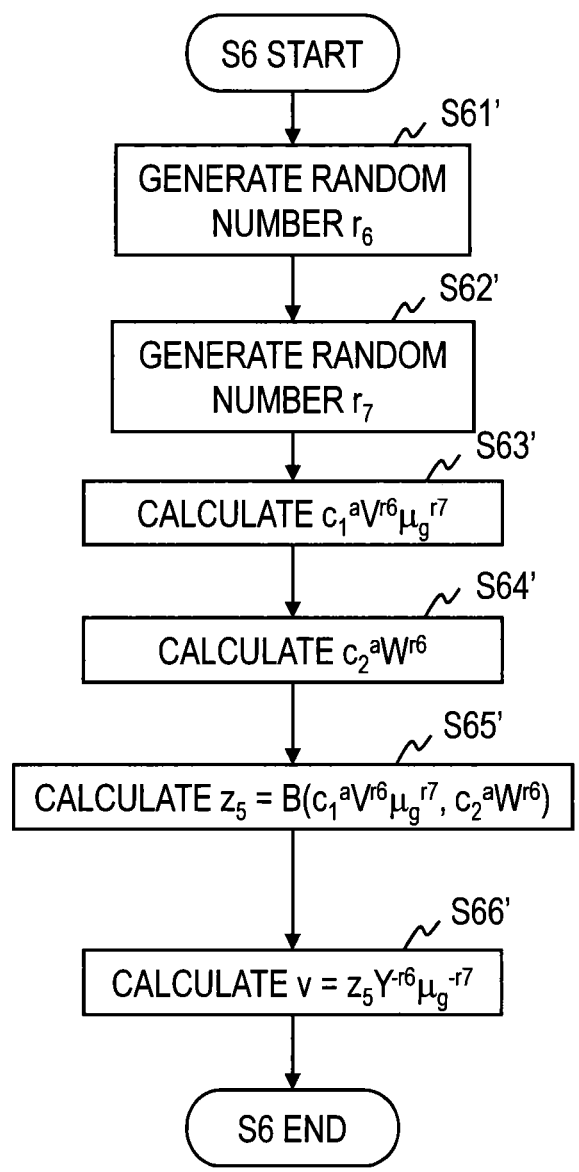
FIG. 10 is a flowchart showing another example of Step S6.

According to the third embodiment, Step S6 is composed of Steps S61' to S66' illustrated in FIG. 10.

The sixth random number generating part 124 generates a uniform random number $r_6$ that is an integer equal to or greater than 0 and smaller than $K_G$ (Step S61'). The generated random number $r_6$ is transmitted to the sixth input information calculating part 126, the seventh input information calculating part 127 and the fifth calculating part 128.

The seventh random number generating part 125 generates a uniform random number $r_7$ that is an integer equal to or greater than 0 and smaller than $K_G$ (Step S62'). The generated random number $r_7$ is transmitted to the sixth input information calculating part 126 and the fifth calculating part 128.

The sixth input information calculating part 126 calculates sixth input information $c_1{}^a V^{r6} \mu_g{}^{r7}$ (Step S63'). The calculated sixth input information $c_1{}^a V^{r6} \mu_g{}^{r7}$ is transmitted to the fifth output information calculating part 28.

The seventh input information calculating part 127 calculates seventh input information $c_2{}^a W^{r6}$ (Step S64'). The calculated seventh input information $c_2{}^a W^{r6}$ is transmitted to the fifth output information calculating part 28.

The fifth output information calculating part 28 performs a calculation using the sixth input information $c_1{}^a V^{r6} \mu_g{}^{r7}$ and the seventh input information $c_2{}^a W^{r6}$ and designates the calculation result as fifth output information $z_5$ (Step S65'). The calculated fifth output information $z_5$ is transmitted to the fifth calculating part 128.

The fifth output information calculating part 28 is capable of calculating $f(c_1{}^a V^{r6} \mu_g, c_2{}^a W^{r6})$. The result of the calculation performed by the fifth output information calculating part 28 may be or may not be $f(c_1{}^a V^{r6} \mu_g, c_2{}^a W^{r6})$.

The fifth calculating part 128 calculates $z_5 Y^{-r6} \mu_g{}^{-r7}$ and designates the calculation result as v (Step S66'). The calculation result v is transmitted to the second exponentiation part 16. Note that $v = z_5 Y^{-r6} \mu_g{}^{-r7} = f(c_1, c_2)^a x_2$. That is, $z_5 Y^{-r6} \mu_g{}^{-r7}$ is a randomizable sampler with an error $X_2$ for $f(c_1, c_2)$. A reason therefor will be described later.

<<Reason why $z_4 Y^{-r4} \mu_g{}^{-r5}$ and $z_5 Y^{-r6} \mu_g{}^{-r7}$ are Randomizable Samplers with Errors $X_1$ and $X_2$ For $f(c_1, c_2)$, Respectively>>

It is supposed that c denotes a natural number, $R_1$, $R_2$, $R_1'$ and $R_2'$ denote random numbers, the result of the calculation performed by the calculating apparatus 2 using $c_1 V^{R1} \mu_g{}^{R2}$ and $c_2{}^c W^{R1}$ is denoted as $B(c_1{}^c V^{R1} \mu_g{}^{R2}, c_2{}^c W^{R1})$ (that is $z = B(c_1{}^c V^{R1} \mu_g{}^{R2}, c_2{}^c W^{R1})$ provided that z is the calculation result returned to the requesting apparatus 1 from the calculating apparatus 2), and the random variable X whose value is an element of the group G is defined as $X < B(V^{R1'} \mu_g{}^{R2'}, W^{R1'}) f(V^{R1'} \mu_g{}^{R2'}, W^{R1'})^{-1}$.

Then, $z Y^{-R1} \mu_g{}^{-R2} = B(c_1{}^c V^{R1} \mu_g{}^{R2}, c_2{}^c W^{R1}) Y^{-R1} \mu_g{}^{-R2} = X f(c_1{}^c V^{R1} \mu_g{}^{R2}, c_2{}^c W^{R1}) Y^{-R1} \mu_g{}^{-R2} = X f(c_1, c_2)^c f(\mu_g, e_g)^{R2} Y^{-R1} \mu_g{}^{-R2} = X f(c_1, c_2)^c Y^{R1} \mu_g{}^{R2} Y^{-R1} \mu_g{}^{-R2} = f(c_1, c_2)^c X$. That is, $z Y^{-R1} \mu_g{}^{-R2}$ is a randomizable sampler with an error X for f(x). Note that $e_g$ is a unit element of the group G.

In development of the formula described above, properties are used that $X = B(V^{R1'} \mu_g{}^{-2'}, W^{R1'}) f(V^{R1'} \mu_g{}^{R2'}, W^{R1'})^{-1} = B(c_1{}^c V^{R1} \mu_g{}^{R2}, c_2{}^c W^{R1}) f(c_1{}^c V^{R1} \mu_g{}^{R2}, c_2{}^c W^{R1})$ and $B(c_1{}^c V^{R1} \mu_g{}^{R2}, c_2{}^c W^{R1}) = X f(c_1{}^c V^{R1} \mu_g{}^{R2}, c_2{}^c W^{R1})$. These properties are based on the fact that $R_1$, $R_2$, $R_1'$ and $R_2'$ are random numbers.

Therefore, taking into consideration the facts that a and b are natural numbers, and $r_4$, $r_5$, $r_6$ and $r_7$ are random numbers, $z_4 Y^{-r4} \mu_g{}^{-r5}$ and $z_5 Y^{-r6} \mu_g{}^{-r7}$ are randomizable samplers with errors $X_1$ and $X_2$ for $f(c_1, c_2)$, respectively.

Modifications of First to Third Embodiment

The random variables $X_1$, $X_2$ and $X_3$ may be the same or differ from each other.

When each of the first random number generating part 110, the second random number generating part 113, the third random number generating part 116, the fourth random number generating part 119, the fifth random number generating part 120, the sixth random number generating part 124 and the seventh random number generating part 125 generates a uniform random number, the security of the proxy calculation system is at the highest level. However, when such a high security level is not required, each of the first random number generating part 110, the second random number generating part 113, the third random number generating part 116, the fourth random number generating part 119, the fifth random number generating part 120, the sixth random number generating part 124 and the seventh random number generating part 125 may generate a random number that is not a uniform random number.

In the examples described above, each of the first randomizable sampler 21 and the second randomizable sampler 22 is invoked once. Alternatively, in order to reduce the number of communications between the requesting apparatus 1 and the calculating apparatus 2, the first randomizable sampler 21 and the second randomizable sampler 22 may be invoked a plurality of times for the same values of a and b to allow the requesting apparatus 1 to acquire a plurality of values of u and v in one communication.

The first randomizable sampler 21, the second randomizable sampler 22 and the sampler 23 may be provided in the requesting apparatus 1 or the calculating apparatus 2. In other words, all these components may be provided in the calculating apparatus 2 as shown in the first embodiment, or some of these components may be provided in the requesting apparatus 1, and the others may be provided in the calculating apparatus 2 as shown in the second and third embodiments, for example.

The parts of the requesting apparatus 1 may exchange data directly or via a storage part (not shown). Similarly, the parts of the calculating apparatus 2 may exchange data directly or via a storage part (not shown).

Each of the requesting apparatus 1 and the calculating apparatus 2 can be implemented by a computer. In this case, specific processings of the functions that the apparatus has to have are described in a program. The computer executes the program, thereby implementing each processing function of the apparatus.

The program that describes the specific processings can be recorded in a computer-readable recording medium. As an alternative to using a computer that executes a predetermined program to provide these apparatuses, at least part of these specific processings may be implemented in a hardware form.

Fourth Embodiment

According to fourth to tenth embodiments, θ(g, h) is calculated using the result of a calculation performed by a calculating apparatus 2' in response to a request from a requesting apparatus 1'.

Figure 11:
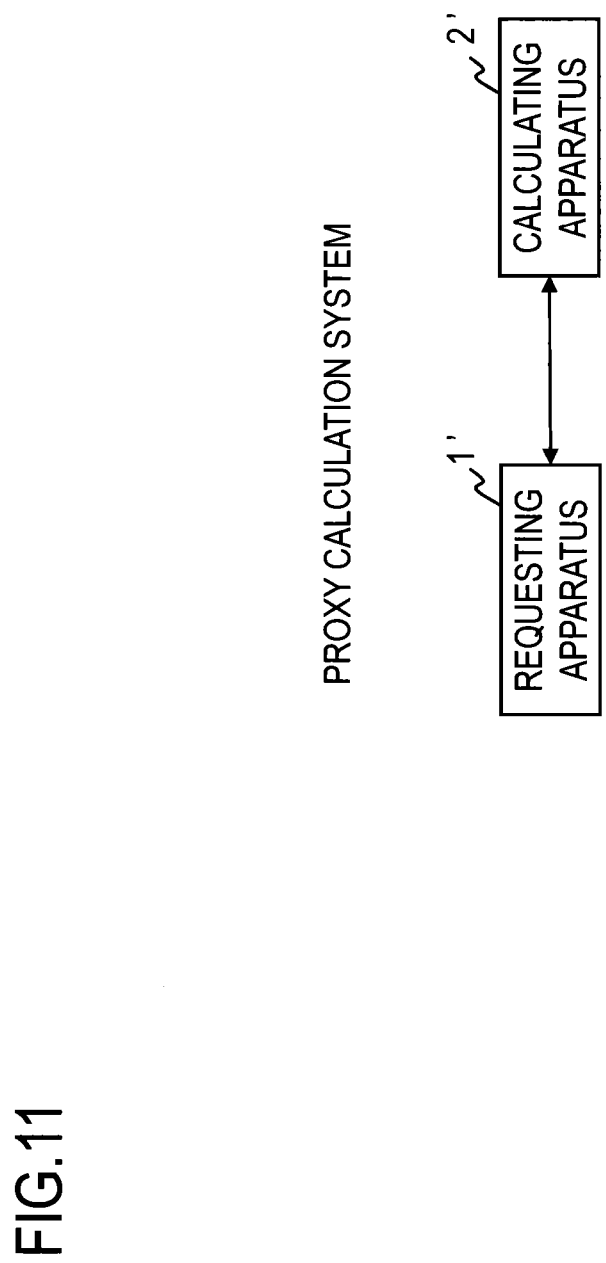
FIG. 11 is a functional block diagram showing an example of a proxy calculation system according to fourth to tenth embodiments.

As illustrated in FIG. 11, a proxy calculation system according to the fourth embodiment comprises the requesting apparatus 1' and the calculating apparatus 2' and calculates a bi-homomorphism θ(g, h) using the result of a calculation performed by the calculating apparatus 2' in response to the requesting apparatus 1'.

It is supposed that G, H and F denote cyclic groups, a map $\theta: G \times H \to F$ is a bi-homomorphism, g denotes an element of the group G, h denotes an element of the group H, $K_G$ denotes the order of the group G, $K_H$ denotes the order of the group H, $\mu_g$ denotes the generator of the group G, $\mu_h$ denotes the generator of the group H, $v=\theta(\mu_g, \mu_h)$, k denotes a security parameter that is an integer equal to or greater than 1, and $K=2^k$.

The "bi-homomorphism" means a map that is homomorphic to each of two inputs. In this example, the map $\theta(g, h)$ is homomorphic to the element g of the group G and to the element h of the group H.

There is a communication channel established between the requesting apparatus 1' and the calculating apparatus 2', and the requesting apparatus 1' and the calculating apparatus 2' can bidirectionally communicate with each other. The communication channel does not have to be concealed, and a third party can intercept the information passing through the communication channel.

The requesting apparatus 1' transmits information scrambled with a random number to the untrusted and/or reliable calculating apparatus 2', and the calculating apparatus 2' performs a calculation using the scrambled information according to a certain algorithm and transmits the calculation result back to the requesting apparatus 1'. The requesting apparatus 1' finally calculates $\theta(g, h)$ by repeating information transmission to and reception from the calculating apparatus 2'.

Figure 15:
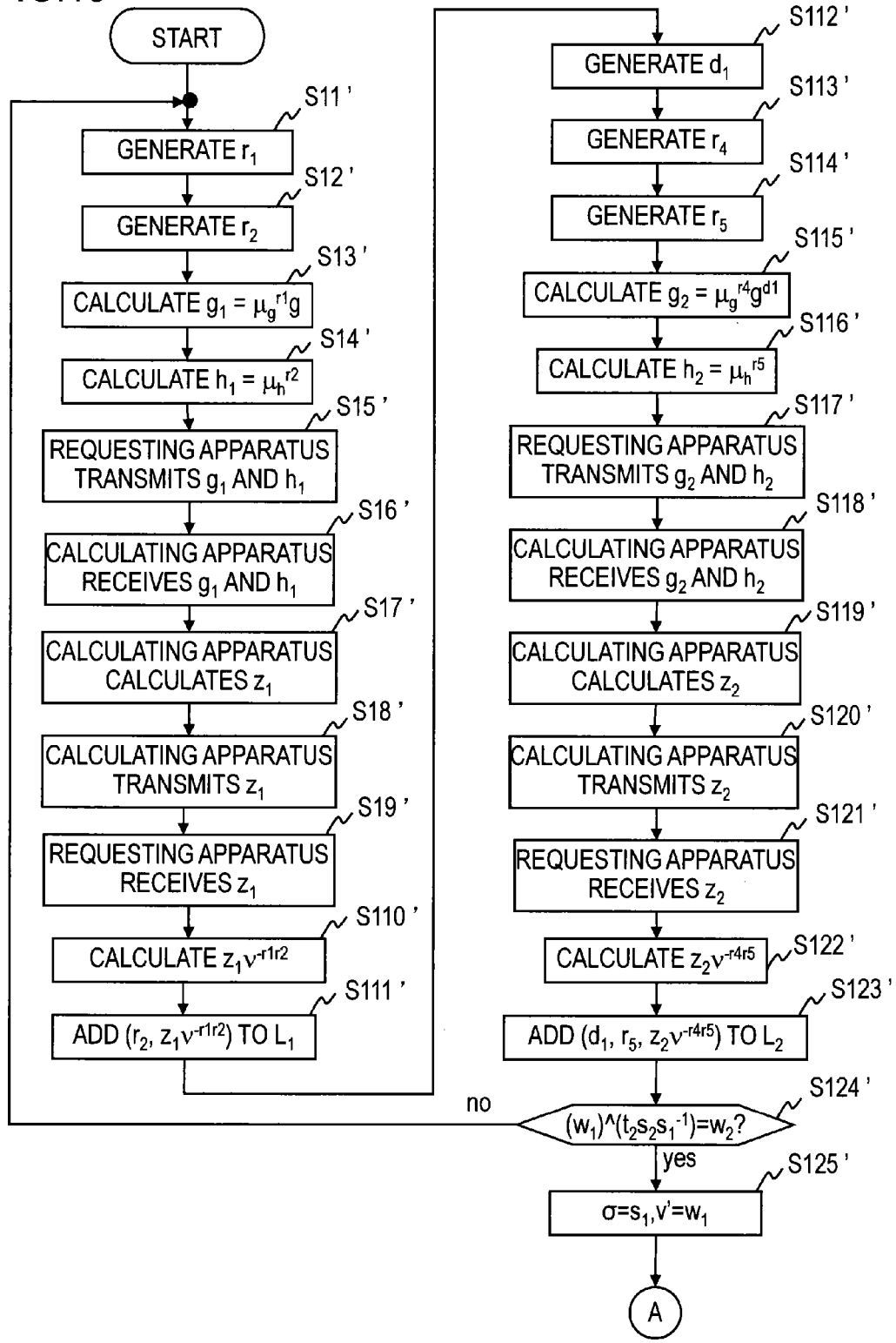
FIG. 15 is a flowchart showing an example of a proxy calculation method according to the fourth to tenth embodiments.

The requesting apparatus 1' first calculate information ($\sigma$, v') that is equivalent to $\theta(g, \mu_4)$ through a process from Step S11' to Step S125' (see FIG. 15), and then calculates $\theta(g, \mu)$ through a process from Step S21' to Step S225' using the information ($\sigma$, v') that is equivalent to $\theta(g, \mu_h)$.

Figure 12:
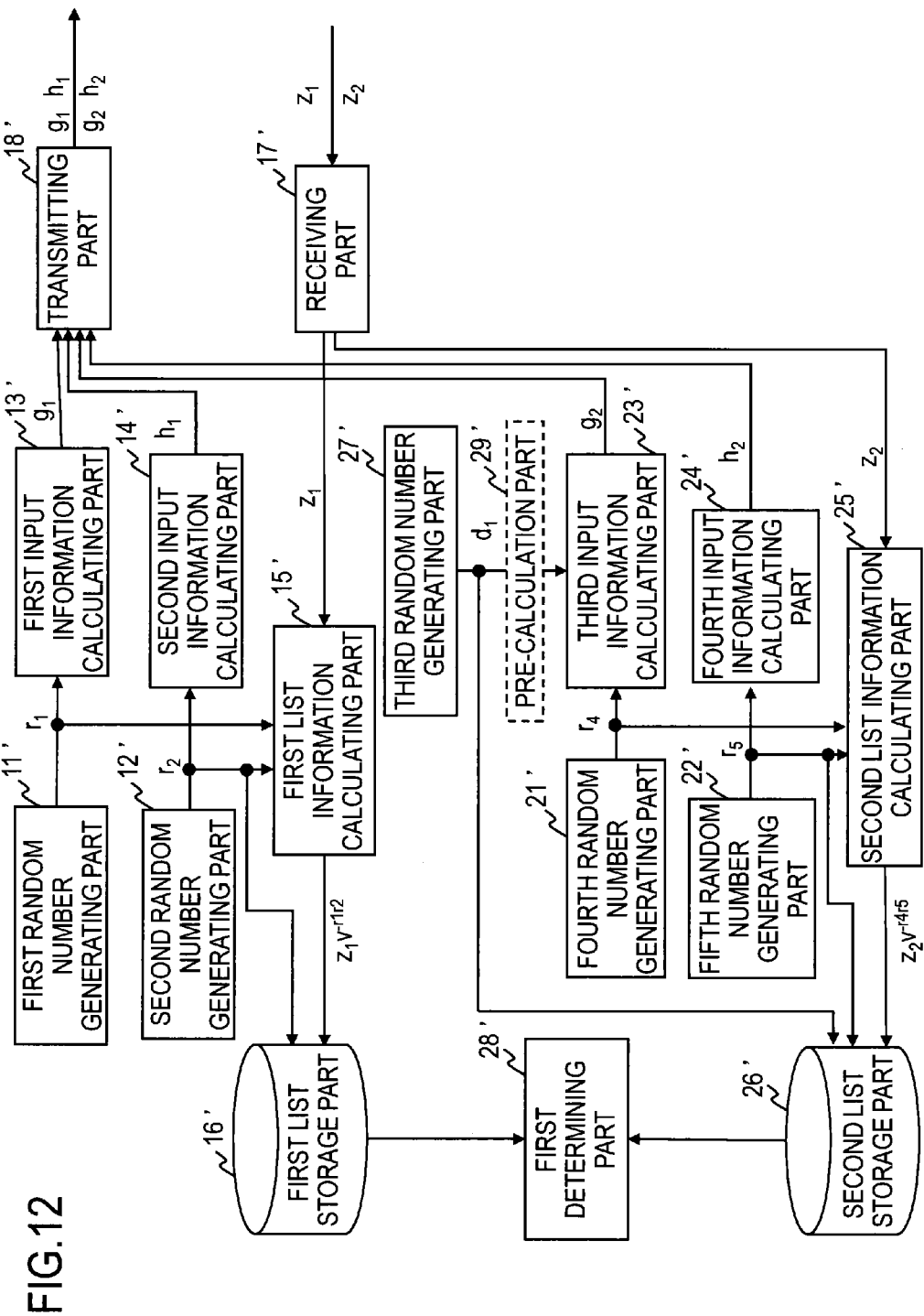
FIG. 12 is a functional block diagram showing an example of a requesting apparatus according to the fourth to tenth embodiments.
Figure 13:
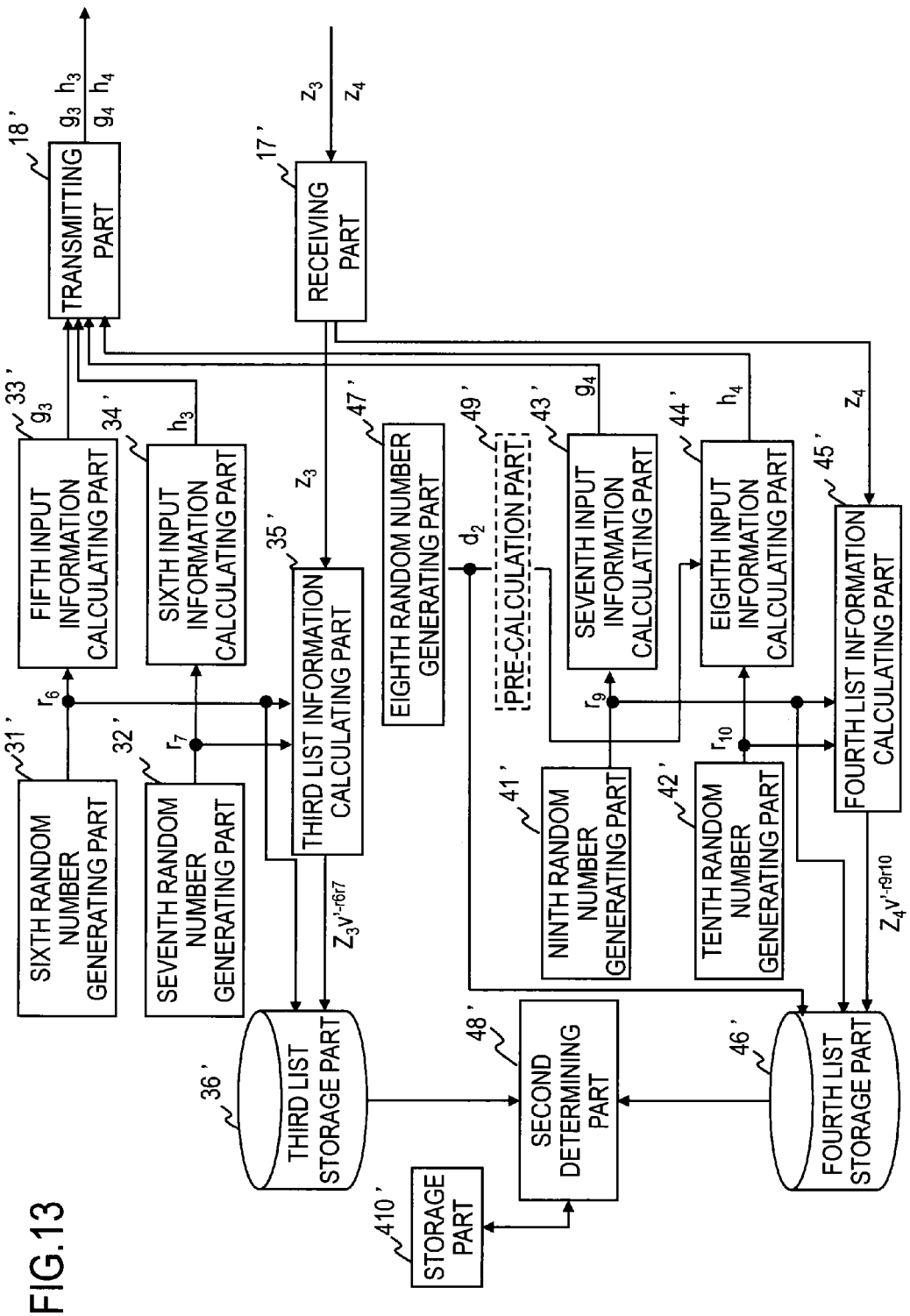
FIG. 13 is a functional block diagram showing an example of the requesting apparatus according to the fourth to tenth embodiments.

As illustrated in FIGS. 12 and 13, the requesting apparatus 1' comprises a first random number generating part 11', a second random number generating part 12', a first input information calculating part 13', a second input information calculating part 14', a first list information calculating part 15', a first list storage part 16', a receiving part 17', a transmitting part 18', a fourth random number generating part 21', a fifth random number generating part 22', a third input information calculating part 23', a fourth input information calculating part 24', a second list information calculating part 25', a second list storage part 26', a third random number generating part 27', a first determining part 28', a sixth random number generating part 31', a seventh random number generating part 32', a fifth input information calculating part 33', a sixth input information calculating part 34', a third list information calculating part 35', a third list storage part 36', a ninth random number generating part 41', a tenth random number generating part 42', a seventh input information calculating part 43', an eighth input information calculating part 44', a fourth list information calculating part 45', a fourth list calculating part 46', an eighth random number generating part 47' and a second determining part 48', for example.

Figure 14:
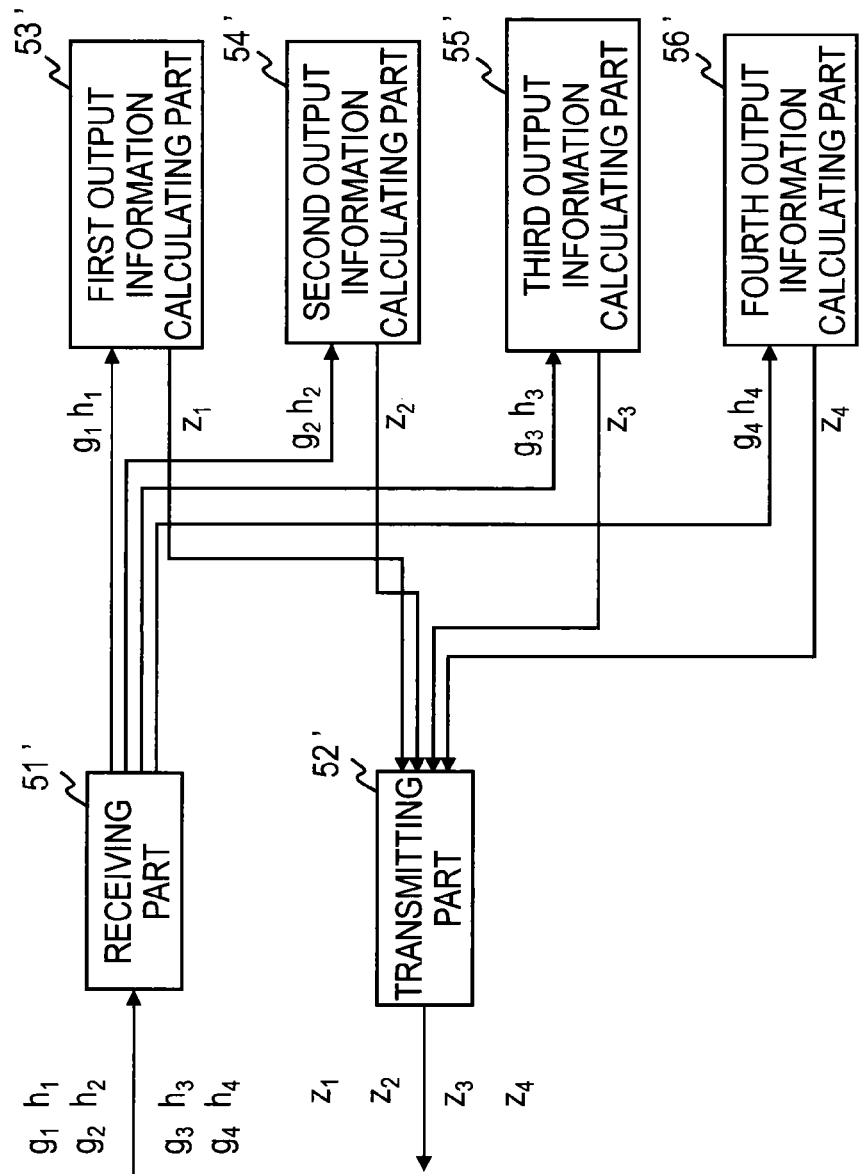
FIG. 14 is a functional block diagram showing an example of a calculating apparatus according to the fourth to tenth embodiments.

As illustrated in FIG. 14, the calculating apparatus 2' comprises a receiving part 51', a transmitting part 52', a first output information calculating part 53', a second output information calculating part 54', a third output information calculating part 55' and a fourth output information calculating part 56', for example.

<Step S11' (FIG. 15)>

The first random number generating part 11' generates a uniform random number $r_1$ that is equal to or greater than 0 and smaller than $K_G$ (Step S11'). The generated random number $r_1$ is transmitted to the first input information calculating part 13' and the first list information calculating part 15'.

<Step S12'>

The second random number generating part 12' generates a uniform random number $r_2$ that is equal to or greater than 0 and smaller than $K_H$ (Step S12'). The generated random number $r_2$ is transmitted to the second input information calculating part 14', the first list information calculating part 15' and the first list storage part 16'.

<Step S13'>

The first input information calculating part 13' calculates first input information $g_1=\mu_g^{r1}g$ (Step S13'). The calculated information $g_1$ is transmitted to the transmitting part 18'.

The superscript "r1" of $\mu_g$ means $r_1$. In this way, in this application, in an expression $\alpha^{\beta\gamma}$ where $\alpha$ denotes a first character, $\beta$ denotes a second character and $\gamma$ denotes a numeral, $\beta\gamma$ means $\beta_\gamma$, that is, $\gamma$ is a subscript of $\beta$.

To calculate $g_1=\mu_g^{r1}g$ means to calculate the value of $g_1$ defined by the formula $\mu_g^{r1}g$. Any calculation process can be used as far as the value of the formula $\mu_g^{r1}g$ can be finally calculated. The same holds true for calculation of any other formulas found in this application.

<Step S14'>

The second input information calculating part 14' calculates second input information $h_1=\mu_h^{r2}$ (Step S14'). The calculated information $h_1$ is transmitted to the transmitting part 18'.

<Step S15'>

The transmitting part 18' transmits the first input information $g_1$ and the second input information $h_1$ to the calculating apparatus 2' (Step S15').

<Step S16'>

The receiving part 51' (FIG. 14) of the calculating apparatus 2' receives the first input information $g_1$ and the second input information $h_1$ (Step S16').

<Step S17'>

The first output information calculating part 53' performs a calculation using the first input information $g_1$ and the second input information $h_1$ and designates the calculation result as first output information $z_1$ (Step S17'). The first output information $z_1$ is transmitted to the transmitting part 52'.

The first output information calculating part 53' is capable of calculating $\theta(g_1, h_1)$. The result of the calculation performed by the first output information calculating part 53' may be or may not be $\theta(g_1, h_1)$.

In this application, the expression "be capable of calculating" means that a calculation is possible with a non-negligible probability. The expression "non-negligible probability" means a probability equal to or higher than $1/f(k)$, where $f(k)$ denotes a polynomial that is a monotonically increasing function of a security parameter k in a broad sense.

<Step S18'>

The transmitting part 52' transmits the first output information $z_1$ to the requesting apparatus 1' (Step S18').

<Step S19'>

The receiving part 17' (FIG. 12) of the requesting apparatus 1' receives the first output information $z_1$ (Step S19'). The received first output information $z_1$ is transmitted to the first list information calculating part 15'. In this example, it is supposed that the first output information $z_1$ is an element of the group F.

<Step S110'>

The first list information calculating part 15' calculates $z_1 v^{-r1r2}$ using the random numbers $r_1$ and $r_2$ and the first output information $z_1$ (Step S110'). The calculated $z_1 v^{-r1r2}$ is transmitted to the first list storage part 16'.

<Step S111'>

An information set ($r_2$, $z_1 v^{-r1r2}$) composed of the random number $r_2$ and the calculated $z_1 v^{-r1r2}$ is added to a list $L_1$. In this example, the first list storage part 16' stores the information set $(r_2, z_1 v^{-r_1 r_2})$ (Step S111').

<Step S112'>

The third random number generating part 27' generates a uniform random number $d_1$ that is equal to or greater than 0 and smaller than K (Step S112'). The generated random number $d_1$ is transmitted to the third input information calculating part 23' and the second list storage part 26'.

<Step S113'>

The fourth random number generating part 21' generates a uniform random number $r_4$ that is equal to or greater than 0 and smaller than $K_G$ (Step S113'). The generated random number $r_4$ is transmitted to the third input information calculating part 23' and the second list information calculating part 25'.

<Step S114'>

The fifth random number generating part 22' generates a uniform random number $r_5$ that is equal to or greater than 0 and smaller than $K_H$ (Step S114'). The generated random number $r_5$ is transmitted to the fourth input information calculating part 24', the second list information calculating part 25' and the second list storage part 26'.

<Step S115'>

The third input information calculating part 23' calculates third input information $g_2 = \mu_g^{r_4} g^{d_1}$ (Step S115'). The calculated third input information $g_2$ is transmitted to the transmitting part 18'.

<Step S116'>

The fourth input information calculating part 24' calculates fourth input information $h_2 = \mu_h^{r_5}$ (Step S116'). The calculated fourth input information $h_2$ is transmitted to the transmitting part 18'.

<Step S117'>

The transmitting part 18' transmits the third input information $g_2$ and the fourth input information $h_2$ to the calculating apparatus 2' (Step S117').

<Step S118'>

The receiving part 51' (FIG. 14) of the calculating apparatus 2' receives the third input information $g_2$ and the fourth input information $h_2$ (Step S118').

<Step S119'>

The second output information calculating part 54' performs a calculation using the third input information $g_2$ and the fourth input information $h_2$ and designates the calculation result as second output information $z_2$ (Step S119'). The second output information $z_2$ is transmitted to the transmitting part 52'.

The second output information calculating part 54' is capable of calculating $\theta(g_2, h_2)$. The result of the calculation performed by the second output information calculating part 54' may be or may not be $\theta(g_2, h_2)$.

<Step S120'>

The transmitting part 52' transmits the second output information $z_2$ to the requesting apparatus 1' (Step S120').

<Step S121'>

The receiving part 17' (FIG. 12) of the requesting apparatus 1' receives the second output information $z_2$ (Step S121'). The received second output information $z_2$ is transmitted to the second list information calculating part 25'. In this example, it is supposed that the second output information $z_2$ is an element of the group F.

<Step S122'>

The second list information calculating part 25' calculates $z_2 v^{-r_4 r_5}$ using the random numbers $r_4$ and $r_5$ and the second output information $z_2$ (Step S122'). The calculated $z_2 v^{-r_4 r_5}$ is transmitted to the second list storage part 26'.

<Step S123'>

An information set $(d_1, r_5, z_2 v^{-r_4 r_5})$ composed of the random numbers $d_1$ and $r_5$ and the calculated $z_2 v^{-r_4 r_5}$ is added to a list $L_2$. In this example, the second list storage part 26' stores the information set $(d_1, r_5, z_2 v^{-r_4 r_5})$ (Step S123').

<Step S124'>

Provided the first element and the second element of the information set read from the first list storage part 16' are denoted by $s_1$ and $w_1$, respectively, and the first element, the second element and the third element of the information set read from the second list storage part 26' are denoted by $t_2$, $s_2$ and $w_2$, respectively, the first determining part 28' determines whether or not these information sets satisfy a relation $(w_1)^{(t_2 s_2 s_1^{-1})} = w_2$ (Step S124').

When the first list storage part 16' and the second list storage part 26' store a plurality of information sets, the first determining part 28' makes the determination of whether the relation described above is satisfied or not for every pair of the information set $(r_2, z_1 v^{-r_1 r_2})$ stored in the first list storage part 16' and the information set $(d_1, r_5, z_2 v^{-r_4 r_5})$ stored in the second list storage part 26'. Of course, the determination processing can be omitted for an information pair for which the determination of whether the relation described above is satisfied or not has already been made.

<Step S125'>

If the relation described above is satisfied, the first determining part 28' substitutes $s_1$ for $\sigma$ and $w_1$ for $v'$ (Step S125'). Note that $v'^{1/\sigma} = w_1^{1/\sigma} = \theta(g, \mu_h)$. A reason why the relation $v'^{1/\sigma} = \theta(g, \mu_h)$ holds will be described later.

If the relation described above is not satisfied, the process returns to Step S11'.

Figure 16:
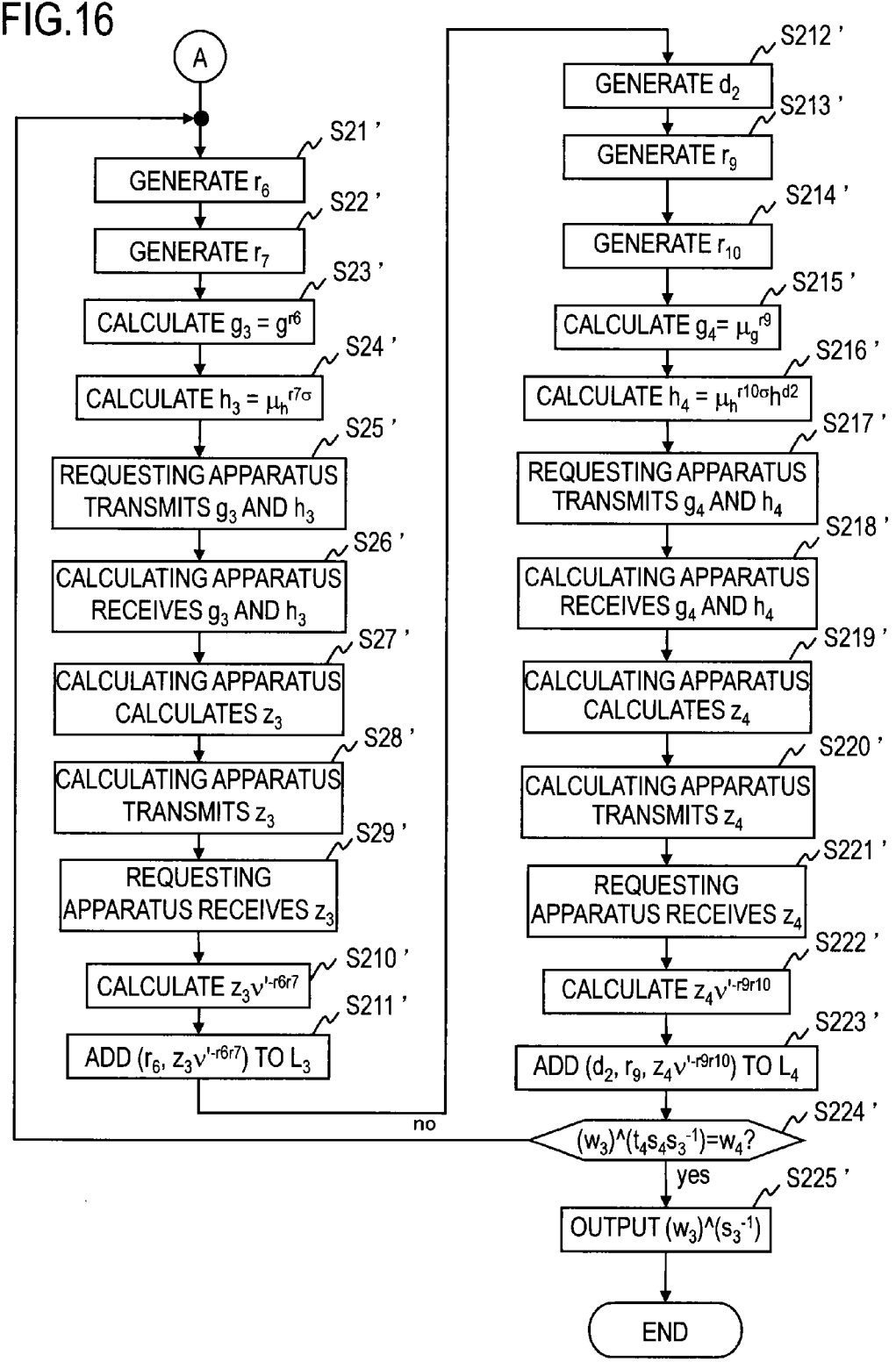
FIG. 16 is a flowchart showing the example of the proxy calculation method according to the fourth to tenth embodiments.

<Step S21' (FIG. 16)>

The sixth random number generating part 31' generates a uniform random number $r_6$ that is equal to or greater than 0 and smaller than $K_G$ (Step S21'). The generated random number $r_6$ is transmitted to the fifth input information calculating part 33', the third list information calculating part 35' and the third list storage part 36'.

<Step S22'>

The seventh random number generating part 32' generates a uniform random number $r_7$ that is equal to or greater than 0 and smaller than $K_H$ (Step S22'). The generated random number $r_7$ is transmitted to the sixth input information calculating part 34' and the third list information calculating part 35'.

<Step S23'>

The fifth input information calculating part 33' calculates fifth input information $g_3 = \mu_g^{r_6}$ (Step S23'). The calculated information $g_3$ is transmitted to the transmitting part 18'.

<Step S24'>

The sixth input information calculating part 34' calculates sixth input information $h_3 = \mu_h^{r_7} h$ (Step S24'). The calculated information $h_3$ is transmitted to the transmitting part 18'.

<Step S25'>

The transmitting part 18' transmits the fifth input information $g_3$ and the sixth input information $h_3$ to the calculating apparatus 2' (Step S25').

<Step S26'>

The receiving part 51' (FIG. 14) of the calculating apparatus 2' receives the fifth input information $g_3$ and the sixth input information $h_3$ (Step S26').

<Step S27'>

The third output information calculating part 55' performs a calculation using the fifth input information $g_3$ and the sixth input information $h_3$ and designates the calculation result as third output information $z_3$ (Step S27'). The third output information $z_3$ is transmitted to the transmitting part 52'.

The third output information calculating part 55' is capable of calculating $\theta(g_3, h_3)$. The result of the calculation performed by the third output information calculating part 55' may be or may not be $\theta(g_3, h_3)$.

<Step S28'>

The transmitting part 52' transmits the third output information $z_3$ to the requesting apparatus 1' (Step S28').

<Step S29'>

The receiving part 17' (FIG. 13) of the requesting apparatus 1' receives the third output information $z_3$ (Step S29'). The received third output information $z_3$ is transmitted to the third list information calculating part 35'. In this example, it is supposed that the third output information $z_3$ is an element of the group F.

<Step S210'>

The third list information calculating part 35' calculates $z_3 v'^{-r_6 r_7}$ using the random numbers $r_6$ and $r_7$ and the third output information $z_3$ (Step S210'). The calculated $z_3 v'^{-r_6 r_7}$ is transmitted to the third list storage part 36'.

<Step S211'>

An information set $(r_6, z_3 v'^{-r_6 r_7})$ composed of the random number $r_6$ and the calculated $z_3 v'^{-r_6 r_7}$ is added to a list $L_3$. In this example, the third list storage part 36' stores the information set $(r_6, z_3 v'^{-r_6 r_7})$ (Step S211').

<Step S212'>

The eighth random number generating part 47' generates a uniform random number $d_2$ that is equal to or greater than 0 and smaller than K (Step S212'). The generated random number $d_2$ is transmitted to the eighth input information calculating part 44' and the fourth list storage part 46'.

<Step S213'>

The ninth random number generating part 41' generates a uniform random number $r_9$ that is equal to or greater than 0 and smaller than $K_G$ (Step S213'). The generated random number $r_9$ is transmitted to the seventh input information calculating part 43', the fourth list information calculating part 45' and the fourth list storage part 46'.

<Step S214'>

The tenth random number generating part 42' generates a uniform random number $r_{10}$ that is equal to or greater than 0 and smaller than $K_H$ (Step S214'). The generated random number $r_{10}$ is transmitted to the eighth input information calculating part 44', the fourth list information calculating part 45' and the fourth list storage part 46'.

<Step S215'>

The seventh input information calculating part 43' calculates seventh input information $g_4 = g^{r_9}$ (Step S215'). The calculated seventh input information $g_4$ is transmitted to the transmitting part 18'.

<Step S216'>

The eighth input information calculating part 44' calculates eighth input information $h_4 = \mu_h^{r_{10} \alpha_h} h^{d_2}$ (Step S216'). The calculated eighth input information $h_4$ is transmitted to the transmitting part 18'.

<Step S217'>

The transmitting part 18' transmits the seventh input information $g_4$ and the eighth input information $h_4$ to the calculating apparatus 2' (Step S217').

<Step S218'>

The receiving part 51' (FIG. 14) of the calculating apparatus 2' receives the seventh input information $g_4$ and the eighth input information $h_4$ (Step S218').

<Step S219'>

The fourth output information calculating part 56' performs a calculation using the seventh input information $g_4$ and the eighth input information $h_4$ and designates the calculation result as fourth output information $z_4$ (Step S219'). The fourth output information $z_4$ is transmitted to the transmitting part 52'.

The fourth output information calculating part 56' is capable of calculating $\theta(g_4, h_4)$. The result of the calculation performed by the fourth output information calculating part 56' may be or may not be $\theta(g_4, h_4)$.

<Step S220'>

The transmitting part 52' transmits the fourth output information $z_4$ to the requesting apparatus 1' (Step S220').

<Step S221'>

The receiving part 17' (FIG. 12) of the requesting apparatus 1' receives the fourth output information $z_4$ (Step S221). The received fourth output information $z_4$ is transmitted to the fourth list information calculating part 45'. In this example, it is supposed that the fourth output information $z_4$ is an element of the group F.

<Step S222'>

The fourth list information calculating part 45' calculates $z_4 v'^{-r_9 r_{10}}$ using the random numbers $r_9$ and $r_{10}$ and the fourth output information $z_4$ (Step S222'). The calculated $z_4 v'^{-r_9 r_{10}}$ is transmitted to the fourth list storage part 46'.

<Step S223'>

An information set $(d_2, r_9, z_4 v'^{-r_9 r_{10}})$ composed of the random numbers $d_2$ and $r_9$ and the calculated $z_4 v'^{-r_9 r_{10}}$ is added to a list $L_4$. In this example, the fourth list storage part 46' stores the information set $(d_2, r_9, z_4 v'^{-r_9 r_{10}})$ (Step S223').

<Step S224'>

Provided the first element and the second element of the information set read from the third list storage part 36' are denoted by $s_3$ and $w_3$, respectively, and the first element, the second element and the third element of the information set read from the fourth list storage part 46' are denoted by $t_4$, $s_4$ and $w_4$, respectively, the second determining part 48' determines whether or not these information sets satisfy a relation $(w_3)^{\wedge}(t_4 s_4 s_3^{-1}) = w_4$ (Step S224').

When the third list storage part 36' and the fourth list storage part 46' store a plurality of information sets, the second determining part 48' makes the determination of whether the relation described above is satisfied or not for every pair of the information set $(r_6, z_3 v'^{-r_6 r_7})$ stored in the third list storage part 36' and the information set $(d_2, r_9, z_4 v'^{-r_9 r_{10}})$ stored in the fourth list storage part 46'. Of course, the determination processing can be omitted for an information pair for which the determination of whether the relation described above is satisfied or not has already been made.

<Step S225'>

If the relation described above is satisfied, the second determining part 48' outputs $(w_3)^{\wedge}(s_3^{-1})$ (Step S225'). Note that $(w_3)^{\wedge}(s_3^{-1}) = \theta(g, h)$. A reason why the relation $(w_3)^{\wedge}(s_3^{-1}) = \theta(g, h)$ holds will be described later.

If the relation described above is not satisfied, the process returns to Step S21'.

When it is difficult to calculate $(w_3)^{\wedge}(s_3^{-1})$, that is, a root of $w_3$, $\theta(g, h)$ can be easily calculated in the following manner. The second determining part 48' stores in a storage part 410' sets $(w_3, s_3)$ of the values $w_3$ and $s_3$ that satisfy the relation $(w_3)^{\wedge}(t_4 s_4 s_3^{-1})$ as a sequence of sets $(\alpha_1, S_1), (\alpha_2, S_2), \ldots, (\alpha_m, S_m)$ by repeating the process from Step S21' to Step S224'. Note that m denotes a natural number. If $S_m$ that is relatively prime to $S_1$ is found, the second determining part 48' calculates integers $L_1$ and $L_2$ that satisfy a relation $L_1 S_1 + L_2 S_m = 1$, and calculates $\alpha_1^{L_1} \alpha_m^{L_2}$ using the integers $L_1$ and $L_2$. $\alpha_1^{L_1} \alpha_m^{L_2} = \theta(g, h)^{(L_1 S_1 + L_2 S_2)} = \theta(g, h)$. When the least common multiple of $S_1, S_2, \ldots$ and $S_m$ is 1, the second determining part 48' can calculate integers $L_1, L_2, \ldots$ and $L_m$ that satisfy a relation $L_1 S_1 + L_2 S_2 + \ldots + L_m S_m = 1$, and calculate $\alpha_1^{L1} \alpha_2^{L2} \ldots \alpha_m^{Lm}$ using the integers $L_1, L_2, \ldots, L_m$. $\alpha_1^{L1} \alpha_2^{L2} \ldots \alpha_m^{Lm} = \theta(g, h)^{(L1S1+L2S2+\ldots+LmSm)} = \theta(g, h)$.

Even if there is an attacker M who can intercept the communication between the requesting apparatus 1' and the calculating apparatus 2', the information exchanged between the requesting apparatus 1' and the calculating apparatus 2' can be concealed from the attacker M by scrambling the information with random numbers ($r_1$, $r_2$, for example) that are known only to the requesting apparatus 1'.

Since the information exchanged between the requesting apparatus 1' and the calculating apparatus 2' is scrambled with random numbers, such as $r_1$ and $r_2$, that are known only to the requesting apparatus 1', the calculating apparatus 2' cannot even know the inputs g and h of $\theta(g, h)$, to say nothing of $\theta(g, h)$ to be finally calculated by the requesting apparatus 1'.

Therefore, the calculating apparatus 2' does not have to be a trusted calculator, so that the requirements on the configuration of the system for calculating a bi-homomorphism can be reduced. Since the calculating apparatus 2' does not have to be a trusted calculator, which is generally expensive and requires high operational cost, the cost of construction and operation of the system for calculating a bi-homomorphism can be reduced.

<<Reason why $v'^{1/\sigma} = \theta(g, \mu_h)$>>

A random variable $S_X(d)$, which is referred to as a randomizable sampler, will be first described. The random variable $S_X(d)$ that is a randomizable sampler with an error X for $w \in F$ is expressed as $S_X(d) = w^d X$, where d denotes a natural number.

Provided that $R_1$, $R_2$, $R_1'$ and $R_2'$ denote random numbers, the result of the calculation performed by the calculating apparatus using $g^d \mu_g^{R1}$ and $\mu_h^{R2}$ is expressed as $B(g^d \mu_g^{R1}, \mu_h^{R2})$ (($z = B(g_d \mu_g^{R1}, \mu_h^{R2})$ where z denotes the calculation result returned to the requesting apparatus from the calculating apparatus), and a random variable X whose value is an element of the group F is defined as $X = B(\mu_g^{R'1}, \mu_h^{R'2})^{1/R'2} \theta(\mu_g^{R'1}, \mu_h)^{-1}$, $S_X(d) = z^{(1/R2)} v^{-R1}$ is a randomizable sampler with an error X for $\theta(g, \mu_h)$.

This is because $S_X(d) = z^{(1/R2)} v^{-R1} = B(g_d \mu_g^{R1}, \mu_h^{R2})^{1/R2} \theta(\mu_g, \mu_h)^{-R1} = X \theta(g_d \mu_g^{R1}, \mu_h) \theta(\mu_g^{R1}, \mu_h)^{-1} = X \theta(g_d, \mu_h) \theta(\mu_g^{R1}, \mu_h)^{-1} = \theta(g, \mu_h)^d X$.

In development of the formula described above, properties are used that $X = B(\mu_g^{R'1}, \mu_h^{R'2})^{1/R'2} = \theta(\mu_g^{R'1}, \mu_h)^{-1} = B(g_d \mu_g^{R1}, \mu_h^{R2})^{1/R2} \theta(g^d \mu_g^{R1}, \mu_h)^{-1}$ and $B(g^d \mu_g^{R1}, \mu_h^{R2})^{1/R2} = X \theta(g^d \mu_g^{R1}, \mu_h)$. These properties are based on the fact that $R_1$, $R_2$, $R_1'$ and $R_2'$ are random numbers.

Provided that a realized value of $S_X(1)$ is expressed as $\theta(g, \mu_h)^1 x_1$, and a realized value of $S_X(d)$ is expressed as $\theta(g, \mu_h)^d x_2$, the inventor has found that the realized value of $S_X(1)$ raised to the d-th power is highly likely to be equal to $S_X(d)$, that is, the relation $(\theta(g, \mu_h)^1 x_1)^d = \theta(g, \mu_h)^d x_2$ is highly likely to hold when $x_1$ and $x_2$ are a unit element $e_f$ of the group F. The proof is omitted herein. When $x_1$ is the unit element $e_f$ of the group F, the realized value of $S_X(1) = \theta(g, \mu_h)^1 x_1 = \theta(g, \mu_h)$.

The proxy calculation system according to the embodiments described above uses these properties of the randomizable sampler.

The process from Step S11' to Step S111' corresponds to calculation of the realized value $\theta(g, \mu_h)^1 x_1$ of $S_X(1)$. The realized value of $S_X(1)$ itself is not actually calculated. However, using ($r_2$, $z_1 v'^{-r1r2}$) resulting from the process, $z_1 v'^{-r1r2}$ is raised to the $1/r_2$-th power. The resulting $(z_1 v'^{-r1r2})^{1/r2}$ is equal to $z_1^{1/r2} v'^{-r1}$, which is equal to the realized value $\theta(g, \mu_h)^1 x_1$ of $S_X(1)$. Similarly, the process from Step S112' to Step S123' corresponds to calculation of the realized value $\theta(g, \mu_h)^{d1} x_2$ of $S_X(d_1)$.

The processing of Step S124' corresponds to determination of whether or not the realized value of $S_X(1)$ raised to the $d_1$th power is equal to $S_X(d_1)$, that is, $(\theta(g, \mu_h) x_1)^{d1} = \theta(g, \mu_h)^{d1} x_2$. This is because the determination criterion $(w_1)^{\hat{}}(t_2 s_2 s_1^{-1})$ used in Step S124' is based on the fact that $(w_1)^{\hat{}}(t_2 s_2 s_1^{-1}) = w_2 \Leftrightarrow (w_1^{2/s1})^{t2} = w_2^{1/s2} \Leftrightarrow (z_1^{1/r2} v^{-r1})^{d1} = z_2^{1/r5} v^{-r4} \Leftrightarrow (\theta(g, \mu_h)^1 x_1)^{d1} = \theta(g, \mu_h)^{d1} x_2 \Leftrightarrow$ the realized value of $S_X(1)$ raised to the $d_1$-th power = the realized value of $S_X(1)$. Note that, according to the definition, $s_1 = r_2$, $w_1 = z_1 v^{-r1r2}$, $t_2 = d_1$, $S_2 = r_5$, and $w_2 = z_2 v^{-r4r5}$.

Furthermore, $\sigma$ and v' in Step S125' correspond to $\theta(g, \mu_h)$. This is because $v'^{1/\sigma} = w_1^{1/s1} = z_1^{1/r2} v^{-r1} = \theta(g, \mu_h)^1 x_1 = \theta(g, \mu_h)$ when the realized value of $S_X(1)$ raised to the $d_1$-th power = the realized value of $S_X(d_1)$ as described above.

<<Reason why $(w_3)^{\hat{}}(s_3^{-1}) = \theta(g, h)$>>

Provided that $R_1$, $R_2$, $R_1'$ and $R_2'$ denote random numbers, the result of the calculation performed by the calculating apparatus using $g^{R1}$ and $h^d \mu_h^{R2}$ is expressed as $B(g^{R1}, h^d \mu_h^{R2})$ ($z = B(g^{R1}, h^d \mu_h^{R2})$ where z denotes the calculation result returned to the requesting apparatus from the calculating apparatus), and a random variable X whose value is an element of the group F is defined as $X = B(g^{R'1}, \mu_h^{R'2})^{1/R'1} \theta(g, \mu_h^{R'2})^{-1}$, $S_X(d) = z^{(1/R1)} v'^{-R2}$ is a randomizable sampler with an error X for $\theta(g, h)$.

This is because $S_X(d) = z^{(1/R1)} v'^{-R2} = B(g^{R1}, h^d \mu_h^{R2})^{1/R1} \theta(g, \mu_h^{R2})^{-R2} = X \theta(g, h^d \mu_h^{R2}) \theta(g, \mu_h^{R2})^{-1} = X \theta(g, h^d) \theta(g, \mu_h^{R2}) \theta(g, \mu_h^{R2})^{-1} = \theta(g, h)^d X$.

In development of the formula described above, properties are used that $X = B(g^{R'1}, \mu_h^{R'2})^{1/R'1} \theta(g, \mu_h^{R'2})^{-1} = B(g^{R1}, \mu_h^{R2})^{1/R1} \theta(g, h^d \mu_h^{R2})^{-1}$ and $B(g^{R1}, h^d \mu_h^{R2})^{1/R1} = X \theta(g, h^d \mu_h^{R1})$. These properties are based on the fact that $R_1$, $R_2$, $R_1'$ and $R_2'$ are random numbers.

Provided that a realized value of $S_X(1)$ is expressed as $\theta(g, h)^1 x_1$, and a realized value of $S_X(d)$ is expressed as $\theta(g, h)^d x_2$, the inventor has found that the realized value of $S_X(1)$ raised to the d-th power is highly likely to be equal to $S_X(d)$, that is, the relation $(\theta(g, h)^1 x_1)^d = \theta(g, h)^d x_2$ is highly likely to hold when $x_1$ and $x_2$ are a unit element $e_f$ of the group F. The proof is omitted herein. When $x_1$ is the unit element $e_f$ of the group F, the realized value of $S_X(\mathbf{1}) = \theta(g, h)^1 x_1 = \theta(g, h)$.

The proxy calculation system according to the embodiments described above uses these properties of the randomizable sampler.

The process from Step S21' to Step S211' corresponds to calculation of the realized value $\theta(g, h)^1 x_1$ of $S_X(1)$. The realized value of $S_X(1)$ itself is not actually calculated. However, using ($r_6$, $z_3 v'^{-r6r7}$) resulting from the process, $z_3 v'^{-r6r7}$ is raised to the $1/r_6$-th power. The resulting $(z_3 v'^{-r6r7})^{1/r6}$ is equal to $z_3 v'^{-r7}$, which is equal to the realized value $\theta(g, h)^1 x_1$ of $S_X(1)$. Similarly, the process from Step S212' to Step S223' corresponds to calculation of the realized value $\theta(g, h)^{d2} x^2$ of $S_X(d_2)$.

The processing of Step S224' corresponds to determination of whether or not the realized value of $S_X(1)$ raised to the $d_2$-th power is equal to the realized value of $S_X(d_2)$, that is, $(\theta(g, h)^1 x_1)^{d2} = \theta(g, h)^{d2} x_2$. This is because the determination criterion $(w_3)^{\hat{}}(t_4 s_4 s_3^{-1}) = w_4$ used in Step S224' is based on the fact that $(w_3)^{\hat{}}(t_4 s_4 s_3^{-1}) = w_4 \Leftrightarrow (w_3^{1/s3})^{t4} = w_4^{1/s4} \Leftrightarrow (z_3^{1/r6} v'^{-r7})^{d2} = z_4^{1/r9} v'^{-r10} \Leftrightarrow (\theta(g, h)^1 x_1)^{d2} = \theta(g, h)^{d2} x_2 \Leftrightarrow$ the realized value of $S_X(1)$ raised to the $d_2$-th power = the realized value of $S_X(d_2)$. Note that, according to the definition, $s_3 = r_6$, $w_3 = z_3 v'^{-r6r7}$, $t_4 = d_2$, $s_4 = r_9$, and $w_4 = z_4 v'^{-r9r10}$.

Furthermore, $(w_3)^{\hat{}}(s_3^{-1})$ in Step S225' corresponds to $\theta(g, h)$. This is because $(w_3)^{\hat{}}(s_3^{-1}) (z_3 v'^{-r6r7})^{\hat{}}(r_6^{-1}) = z_3^{1/r6} v'^{r7} = \theta$ $(g, h)^1 x_1 = \theta(g, h)$ when the realized value of $S_X(1)$ raised to the $d_2$-th power=the realized value of $S_X(d_2)$ as described above.

Fifth Embodiment

A proxy calculation system according to a fifth embodiment differs from the proxy calculation system according to the fourth embodiment in Steps S13', S110' and S111' and is the same as the proxy calculation system according to the fourth embodiment in the other respects. The following description will be mainly focused on the differences from the fourth embodiment.

The first input information calculating part 13' does not calculate the first input information defined as $g_1 = \mu_g^{r1} g$ but calculates first input information defined as $g_1 = g^{r1}$ (Step S13').

The first list information calculating part 15' does not use $z_1 v^{-r1 r2}$ but uses the random numbers $r_1$ and $r_2$ to calculate $r_1 r_2$, and transmits the calculation result to the first list storage part 16' (Step S110').

The first list storage part 16' does not store the information set $(r_2, z_2 v^{-r1 r2})$ but stores information set $(r_1 r_2, z_1)$ composed of the calculated $r_1 r_2$ and $z_1 \in F$ received from the calculating apparatus 2' (Step S111').

While Step S110' in the fourth embodiment is to perform exponentiation of $z_1 v^{-r1 r2}$ for the group F, Step S110' in the fifth embodiment is to calculate $r_1 r_2$, so that the number of calculations is reduced by one. Since the number of exponentiations is reduced in this way, the calculation efficiency can be improved. If it is difficult to calculate a nontrivial root for the groups G and H, the security does not deteriorate compared with the fourth embodiment.

Sixth Embodiment

A proxy calculation system according to a sixth embodiment differs from the proxy calculation system according to the fourth embodiment in Steps S24', S210' and S211' and is the same as the proxy calculation system according to the fourth embodiment in the other respects. The following description will be mainly focused on the differences from the fourth embodiment.

The sixth input information calculating part 34' does not calculate the sixth input information defined as $h_3 = \mu_h^{r7 \sigma}$ but calculates sixth input information defined as $h_3 = h^{r7}$ (Step S24').

The third list information calculating part 35' does not use $z_3 v'^{-r6 r7}$ but uses the random numbers $r_6$ and $r_7$ to calculate $r_6 r_7$ (Step S210').

The third list storage part 36' does not store the information set $(r_6, z_3 v'^{-r6 r7})$ but stores information set $(r_6 r_7, z_3)$ composed of the calculated $r_6 r_7$ and $z_3 \in F$ received from the calculating apparatus 2' (Step S211').

While Step S210' in the fourth embodiment is to perform exponentiation of $z_3 v'^{-r6 r7}$ for the group F, Step S210' in the sixth embodiment is to calculate $r_6 r_7$, so that the number of calculations is reduced by one. Since the number of exponentiations is reduced in this way, the calculation efficiency can be improved.

If it is difficult to calculate a nontrivial root for the groups G and H, the security does not deteriorate compared with the fourth embodiment.

Seventh Embodiment

A proxy calculation system according to a seventh embodiment differs from the proxy calculation system according to the fourth embodiment in Steps S125' and S214' and is the same as the proxy calculation system according to the fourth embodiment in the other respects. The following description will be mainly focused on the differences from the fourth embodiment.

If the relation described above is satisfied, the first determining part 28' substitutes $t_1 s_2$ for $\sigma$ and $w_2$ for $v'$ (Step S125').

The tenth random number generating part 42' calculate $-r_9^{-1}$ using the random number $r_9$ and designates the calculation result as $r_{10}$ (Step S214').

Since the definition of $v'$ is modified to make $\sigma$ a random number that is difficult to guess in this way, the security is improved. In addition, since the random number $r_9$ is used to calculate the random number $r_{10}$, the number of generations of random numbers can be reduced. It may seem that the randomness of the eighth input information $h_4 = \mu_h'^{r10 \sigma} h^{d2}$ decreases and the security deteriorates because the random number $r_{10}$ is determined by the random number $r_9$, but the security does not actually deteriorate because the eighth input information $h_4 = \mu_h'^{r10 \sigma} h^{d2}$ is scrambled not only with the random number $r_{10}$ but also $\sigma$.

According to the seventh embodiment, Steps S22' and S211' may also be modified as described below.

The seventh random number generating part 32' calculates $-r_6^{-1}$ using the random number $r_6$ and designates the calculation result as $r_7$ (Step S22').

The third list storage part 36' stores information set (1, $z_3 v'^{-r6 r7}$) composed of 1 and the calculated $z_3 v'^{-r6 r7}$ (Step S211').

Since the random number $r_7$ is calculated using the random number $r_6$ in this way, the number of generations of random numbers can be reduced.

If it is difficult to calculate a nontrivial root for the groups G and H, the security does not deteriorate compared with the fourth embodiment.

Eighth Embodiment

A proxy calculation system according to an eighth embodiment differs from the proxy calculation system according to the fourth embodiment in Step S113' and is the same as the proxy calculation system according to the fourth embodiment in the other respects. The following description will be mainly focused on the differences from the fourth embodiment.

Before Step S113', the fifth random number generating part 22' generates the random number $r_5$ (Step S114').

The fourth random number generating part 21' calculates $-r_5^{-1}$ using the random number $r_5$ and designates the calculation result as $r_4$ (Step S113').

Since the random number $r_4$ is calculated using the random number $r_5$ in this way, the number of generations of random numbers can be reduced.

If it is difficult to calculate an arbitrary element h of the group H that satisfies a relation $\theta(g, h) = v$ where $g \in G$, the security does not deteriorate compared with the fourth embodiment.

Ninth Embodiment

A proxy calculation system according to a ninth embodiment differs from the proxy calculation system according to the fourth embodiment in Step S115' and in that the requesting apparatus 1' further comprises a pre-calculation part 29' shown by a dashed line in FIG. 12 and is the same as the proxy calculation system according to the fourth embodiment in the other respects. The following description will be mainly focused on the differences from the fourth embodiment.

The pre-calculation part 29' calculates $g^{d_1}$ using $d_1$ generated by the third random number generating part 27'. This processing is performed after Step S112' and before Step S115'.

The third input information calculating part 23' calculates $g_2 = \mu_g^{r_4} g^{d_1}$ using the previously calculated $g^{d_1}$ (Step S115').

If the determination criterion is not satisfied in Step S114', the process from Step S11' to Step S123' is repeated, and when the process is repeated, the previously calculated $g^{d_1}$ is reused. That is, the third random number generating part 27' does not generate the random number $d_1$, and the third input information calculating part 23' calculates $g_2 = \mu_g^{r_4} g^{d_1}$ using the previously calculated $g^{d_1}$. As a result, the number of generations of the random number $d_1$ can be reduced, and $g_2 = \mu_g^{r_4} g^{d_1}$ can be calculated in a shorter time.

Tenth Embodiment

A proxy calculation system according to a tenth embodiment differs from the proxy calculation system according to the fourth embodiment in Step S216' and in that the requesting apparatus 1' further comprises a pre-calculation part 49' shown by a dashed line in FIG. 13 and is the same as the proxy calculation system according to the fourth embodiment in the other respects. The following description will be mainly focused on the differences from the fourth embodiment.

The pre-calculation part 49' calculates $h^{d_2}$ using $d_2$ generated by the eighth random number generating part 47'. This processing is performed after Step S212' and before Step S216'.

The eighth input information calculating part 44' calculates $h_4 = \mu_h^{r_{10}} h^{d_2}$ using the previously calculated $h^{d_2}$ (Step S216').

If the determination criterion is not satisfied in Step S214', the process from Step S21' to Step S223' is repeated, and when the process is repeated, the previously calculated $h^{d_2}$ is reused. That is, the eighth random number generating part 47' does not generate the random number $d_2$, and the eighth input information calculating part 44' calculates $h_4 = \mu_h^{r_{10}} h^{d_2}$ using the previously calculated $h^{d_2}$. As a result, the number of generations of the random number $d_2$ can be reduced, and $h_4 = \mu_h^{r_{10}} h^{d_2}$ can be calculated in a shorter time.

Modifications of Fourth to Tenth Embodiment

When each of the first random number generating part 11', the second random number generating part 12', the third random number generating part 27', the fourth random number generating part 21', the fifth random number generating part 22', the sixth random number generating part 31', the seventh random number generating part 32', the eighth random number generating part 47', the ninth random number generating part 41' and the tenth random number generating part 42' generates a uniform random number, the security of the proxy calculation system is at the highest level. However, when such a high security level is not required, each of the first random number generating part 11', the second random number generating part 12', the third random number generating part 27', the fourth random number generating part 21', the fifth random number generating part 22', the sixth random number generating part 31', the seventh random number generating part 32', the eighth random number generating part 47', the ninth random number generating part 41' and the tenth random number generating part 42' may generate a random number that is not a uniform random number.

The first determining part 28' may perform the processing each time an information set is added to the lists $L_1$ and $L_2$. For example, in the case where the second list storage part 26' stores the information set $(d_1, r_5, z_2 v^{r_4 r_5})$, the processing of Step S124' may be performed after Step S111'. Similarly, the second determining part 48' may perform the processing each time an information set is added to the lists $L_3$ and $L_4$.

The fourth to tenth embodiments can be combined with each other.

The parts of the requesting apparatus 1' may exchange data directly or via a storage part (not shown). Similarly, the parts of the calculating apparatus 2' may exchange data directly or via a storage part (not shown).

Each of the requesting apparatus 1' and the calculating apparatus 2' can be implemented by a computer. In this case, specific processings of the functions that the apparatus has to have are described in a program. The computer executes the program, thereby implementing each processing function of the apparatus.

The program that describes the specific processings can be recorded in a computer-readable recording medium. As an alternative to using a computer that executes a predetermined program to provide these apparatuses, at least part of these specific processings may be implemented in a hardware form.

Figure 17:
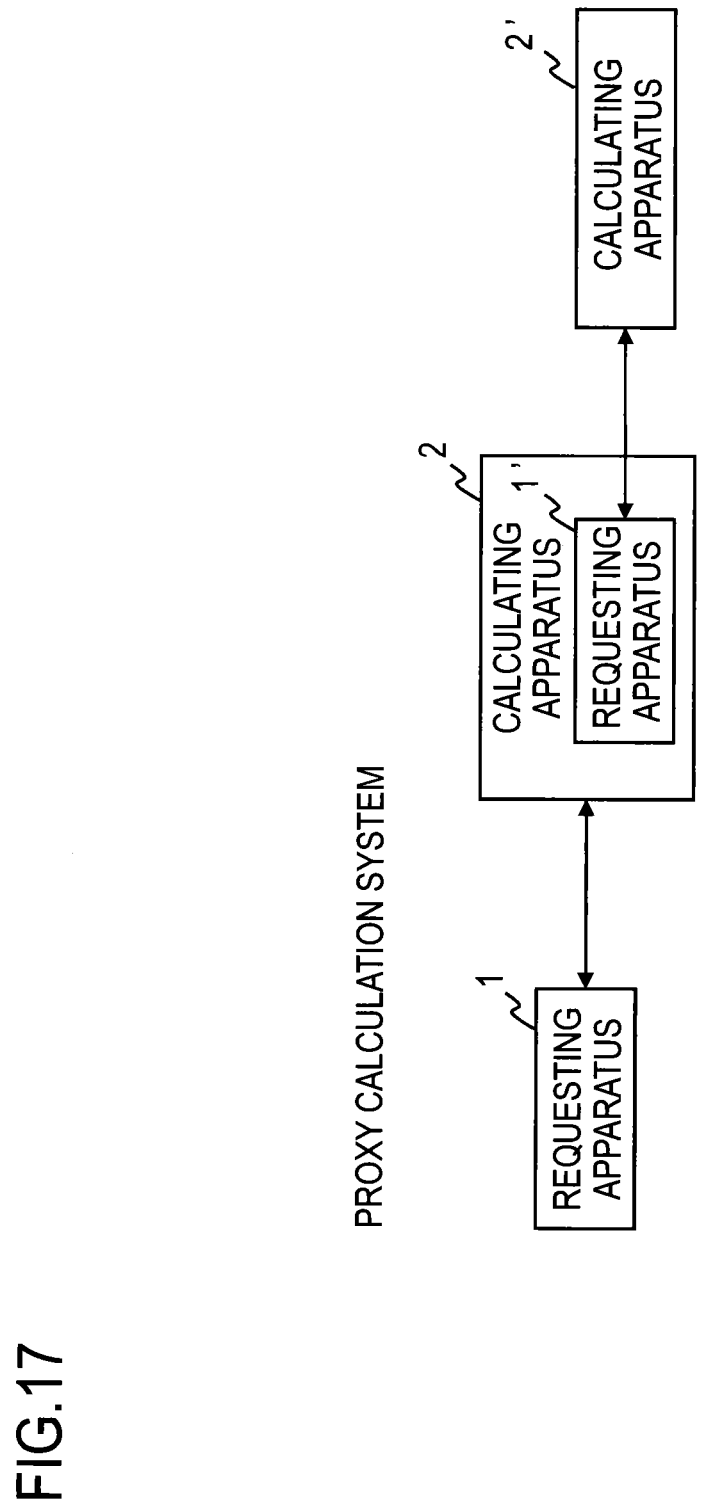
FIG. 17 is a functional block diagram showing a modification of the proxy calculation system.

The first to third embodiments and the fourth to tenth embodiments may be combined with each other. For example, as illustrated in FIG. 17, the calculating apparatus 2 according to the first to third embodiments may comprise the requesting apparatus 1' according to the fourth to tenth embodiments, and the calculating apparatus 2 comprising the requesting apparatus 1' may calculate the function f using the calculating apparatus 2' as described above with regard to the fourth to tenth embodiments.

More specifically, in order to calculate the function $f(x)$ that needs to be calculated, the calculating apparatus 2 uses the calculating apparatus 2' to calculate the value of the corresponding map $\theta(g, h)$. The map $\theta(g, h)$ corresponding to the function $f(x)$ is a map $\theta(g, h)$ that outputs the same value as the function $f(x)$ for a given function f and a given value x. If there is a relation $f(x) = \theta(x, h)$ for an element $h \in H$, a map $\theta$ corresponding to $f(x)$ is $\theta(x, h)$.

For example, in the Boneh/Franklin ID-based encryption described in Reference 1, a decryption function for a certain ID is denoted by f. In this ID-based encryption, finite groups G and H of points on an elliptic curve and pairing $\sigma: G \times H \to F$ are used. Q denotes an element of the group G. A secret key of a key distribution center for the ID-based encryption is denoted by s, and a public key is denoted by P=sQ. Public parameters of the ID-based encryption are descriptions of the groups G and H, a description of the pairing $\tau$, and Q and P.

[Reference 1] Dan Boneh, Matt Franklin, "Identity-Based Encryption from the Weil Pairing", CRYPTO 2001, LNCS 2139, pp. 213-229, 2001.

Issue of a key occurs as described below. The key distribution center calculates $P_{ID} = sQ_{ID}$ for an element $Q_{ID}$ of the group H that depends on the ID and notifies a holder of the ID of the $P_{ID} = sQ_{ID}$. $P_{ID}$ is a secret key of the holder of the ID. The decryption function $f: G \to F$ is defined as $f(x) = \tau(s, P_{ID})$.

Generation of a cipher text and decryption of the cipher text occur as described below. A plain text m is encrypted for an ID by generating a random number r and calculating $(Q^r, m(+) H(\tau(P^r, Q_{ID})))$, which is a cipher text $(C_1, C_2)$. The cipher text is decrypted into the plain text by calculating $C_2(+)H(f(C_1))$ for the cipher text $(C_1, C_2)$. Note that H denotes a hash function, and (+) denotes exclusive OR.

In the Boneh/Franklin ID-based encryption, the map θ for the function f(x) is defined using the pairing τ, for example. Specifically, $f(x)=\tau(x, P_{ID})$.

In the case where the calculating apparatus 2 is an IC card or a cellular phone, which is not susceptible to extraction of secret information but has a limited computational capacity, combining multiple requesting apparatuses and multiple calculating apparatuses in this way is advantageous.

The present invention is not limited to the embodiments described above, and various modifications can be made as required without departing from the spirit of the present invention.

What is claimed is:

1. A proxy calculation system, comprising:
processing circuitry configured to calculate integers a' and b' that satisfy a relation a'a+b'b=1 using two natural numbers a and b that are relatively prime;
a first randomizable sampler configured to calculate $f(x)^b x_1$ and designate the calculation result as u; and
a second randomizable sampler configured to calculate $f(x)^a x_2$ and designate the calculation result as v,
wherein the processing circuitry is further configured to
calculate $u'=u^a$,
calculate $v'=v^b$,
determine whether or not there are values of u' and v' that satisfy u'=v' after every calculation of u' and v' for no more than a predetermined number of iterations of receiving newly calculated values of u and v from the calculating apparatus,
calculate $u^{b'}v^{a'}$ in a case where it is determined that u'=v', and
determine that calculation of $u^{b'}v^{a'}$ is impossible based on a calculation reliability of an apparatus that includes the first randomizable sampler and the second randomizable sampler being lower than a reference value when there are no values of u' and v' that satisfy u'=v' after the predetermined number of iterations are completed,
where G and H are cyclic groups, f is a function that maps an element x of the group H into the group G, $X_1$ and $X_2$ are random variables whose values are elements of the group G, $x_1$ is a realized value of the random variable $X_1$, and $x_2$ is a realized value of the random variable $X_2$.

2. The proxy calculation system according to claim 1, further comprising:
a sampler configured to calculate $f(x)x_3$, where $X_3$ is a random variable whose value is an element of the group G and $x_3$ is a realized value of the random variable $X_3$, performs the calculation instead of said second randomizable sampler and designates the calculation result as said v when a=1, and performs the calculation instead of said first randomizable sampler and designates the calculation result as said u when b=1.

3. The proxy calculation system according to claim 1, wherein said first randomizable sampler generates a random number $r_1$ that is an integer equal to or greater than 0 and smaller than $K_H$, calculates first input information $\mu_h^{r1}x^b$, calculates $f(\mu_h^{r1}x^b)$ using said first input information $\mu_h^{r1}x^b$ and designates the calculation result as first output information $z_1$, and calculates $z_1v^{-r1}$ and designates the calculation result as said u, and
said second randomizable sampler generates a random number $r_2$ that is an integer equal to or greater than 0 and smaller than $K_H$, calculates second input information $\mu_h^{r2}x^a$, calculates $f(\mu_h^{r2}x^a)$ using said second input information $\mu_h^{r2}x^a$ and designates the calculation result as second output information $z_2$, and calculates $z_2v^{-r2}$ and designates the calculation result as said v,
where said f is a homomorphism, $\mu_h$ is a generator of the group H, $K_H$ is an order of the group H, and $v=f(\mu_h)$.

4. The proxy calculation system according to claim 3, further comprising:
a sampler that generates a random number $r_3$ that is an integer equal to or greater than 0 and smaller than $K_H$, calculates third input information $x^{r3}$, calculates $f(x^{r3})$ using said third input information $x^{r3}$ and designates the calculation result as third output information $z_3$, and calculates $z_3^{1/r3}$ instead of said second randomizable sampler and designates the calculation result as said v when a=1 and calculates $z_3^{1/r3}$ instead of said first randomizable sampler and designates the calculation result as said u when b=1.

5. The proxy calculation system according to claim 1, wherein said first randomizable sampler generates a random number $r_4$ that is an integer equal to or greater than 0 and smaller than $K_G$, generates a random number $r_5$ that is an integer equal to or greater than 0 and smaller than $K_G$, calculates fourth input information $c_1^b V^{r4} \mu_g^{r5}$, calculates fifth input information $c_2^b W^{r4}$, calculates $f(c_1^b V^{r4} \mu_g^{r5}, c_2^b W^{r4})$ using said fourth input information $c_1^b V^{r4} \mu_g^{r5}$ and said fifth input information $c_2^b W^{r4}$ and designates the calculation result as fourth output information $z_4$, and calculates $z_4 Y^{-r4} \mu_g^{-r5}$ and designates the calculation result as said u, and
said second randomizable sampler generates a random number $r_6$ that is an integer equal to or greater than 0 and smaller than $K_G$ generates a random number $r_7$ that is an integer equal to or greater than 0 and smaller than $K_G$, calculates sixth input information $c_1^a V^{r6} \mu_g^{r7}$, calculates seventh input information $c_2^a W^{r6}$, calculates $f(c_1^a V^{r6} \mu_g^{r7}, c_2^a W^{r6})$ using said sixth input information $c_1^a V^{r6} \mu_g^{r7}$ and said seventh input information $c_2^a W^{r6}$ and designates the calculation result as fifth output information $z_5$, and calculates $z_5 Y^{-r6} \mu_g^{-r7}$ and designates the calculation result as said v,
where the group H=G×G, said f is a homomorphism, $\mu_g$ is a generator of the group G, $K_G$ is an order of the group G, $x=(c_1, c_2)$, (V, W) is an element of the group H, and f(V, W)=Y.

6. A proxy calculation method, implemented by a proxy calculation system, comprising:
calculating, by processing circuitry, integers a' and b' that satisfy a relation a'a+b'b=1 using two natural numbers a and b that are relatively prime;
calculating, by a first randomizable sample, $f(x)^b x_1$ and designating the calculation result as u;
calculating, by a second randomizable sampler, $f(x)^a x_2$ and designating the calculation result as v';
calculating $u'=u^a$;
calculating $v'=v^b$;
determining whether or not there are values of u' and v' that satisfy u'=v' after every calculation of u' and v' for no more than a predetermined number of iterations of receiving newly calculated values of u and v from the calculating apparatus;
calculating $u^{b'}v^{a'}$ in a case where it is determined that u'=v'; and
determining that calculation of $u^{b'}v^{a'}$ is impossible based on a calculation reliability of an apparatus that includes the first randomizable sampler and the second randomizable sampler being lower than a reference value when there are no values of u' and v' that satisfy u'=v' after the predetermined number of iterations are completed, where G and H are cyclic groups, f is a function that maps an element x of the group H into the group G, $X_1$ and $X_2$ are random variables whose values are elements of the group G, $x_1$ is a realized value of the random variable $X_1$, and $x_2$ is a realized value of the random variable $X_2$.

7. A requesting apparatus, comprising:
processing circuitry configured to
  calculate integers a' and b' that satisfy a relation $a'a+b'b=1$ using two natural numbers a and b that are relatively prime;
  calculate $u'=u^a$ using a calculation result u from a first randomizable sampler configured to calculate $f(x)^b x_1$;
  calculate $v'=v^b$ using a calculation result v from a second randomizable sampler configured to calculate $f(x)^a x_2$;
  determine whether or not there are values of u' and v' that satisfy $u'=v'$ after every calculation of u' and v' for no more than a predetermined number of iterations of receiving newly calculated values of u and v from the calculating apparatus;
  calculate $u^{b'}v^{a'}$ in a case where it is determined that $u'=v'$; and
  determine that calculation of $u^{b'}v^{a'}$ is impossible based on a calculation reliability of an apparatus that includes the first randomizable sampler and the second randomizable sampler being lower than a reference value when there are no values of u' and v' that satisfy $u'=v'$ after the predetermined number of iterations are completed,
where G and H are cyclic groups, f is a function that maps an element x of the group H into the group G, $X_1$ and $X_2$ are random variables whose values are elements of the group G, $x_1$ is a realized value of the random variable $X_1$, and $x_2$ is a realized value of the random variable $X_2$.

8. A proxy calculation system that calculates $\theta(g, h)$ using a result of a calculation performed by a calculating apparatus in response to a request from a requesting apparatus,
  wherein said requesting apparatus comprises processing circuitry configured to:
    start a first calculation sequence by generating a random number $r_1$ that is an integer equal to or greater than 0 and smaller than $K_G$;
    generate, as part of the first calculation sequence, a random number $r_2$ that is an integer equal to or greater than 0 and smaller than $K_H$;
    calculate, as part of the first calculation sequence, first input information $g_1=\mu_g^{r_1}g$;
    calculate, as part of the first calculation sequence, second input information $h_1=\mu_h^{r_2}$;
    calculate, as part of the first calculation sequence, $z_1 v^{-r_1 r_2}$ using $z_1 \in F$ received from said calculating apparatus;
    store into a first memory area, as part of the first calculation sequence, an information set $(r_2, z_1 v^{-r_1 r_2})$ composed of said random number $r_2$ and said calculated $z_1 v^{-r_1 r_2}$;
    generate, as part of the first calculation sequence, a uniform random number $d_1$ that is an integer equal to or greater than 0 and smaller than K;
    generate, as part of the first calculation sequence, a uniform random number $r_4$ that is an integer equal to or greater than 0 and smaller than $K_G$;
    generate, as part of the first calculation sequence, a uniform random number $r_5$ that is an integer equal to or greater than 0 and smaller than $K_H$;
    calculate, as part of the first calculation sequence, third input information $g_2=\mu_g^{r_4}g^{d_1}$;
    calculate, as part of the first calculation sequence, fourth input information $h_2=\mu_h^{r_5}$;
    calculate, as part of the first calculation sequence, $z_2 v^{-r_4 r_5}$ using $z_2 \in F$ received from said calculating apparatus;
    store into a second memory area, as part of the first calculation sequence, an information set $(d_1, r_5, z_2 v^{-r_4 r_5})$ composed of said $d_1$, said $r_5$ and said calculated $z_2 v^{-r_4 r_5}$;
    determine, as a final step in the first calculation sequence, whether or not the information set read from said first memory area and the information set read from said second memory area satisfy a relation $(w_1)\hat{}(t_2 s_2 s_1^{-1})=w_2$, and substitute $s_1$ for $\sigma$ and $w_1$ for v' in a case where the relation is satisfied, where $s_1$ and $w_1$ are a first component and a second component of the information set read from said first memory area, respectively, and $t_2$, $s_2$ and $w_2$ are a first component, a second component and a third component of the information set read from said second memory area, respectively, and repeat the first calculation sequence when the information set read from said first memory and the information set read from said second memory area do not satisfy a relation $(w_1)\hat{}(t_2 s_2 s_1^{-1})=w_2$;
    generate, when the first calculation sequence is completed and as a start of a second calculation sequence, a uniform random number $r_6$ that is an integer equal to or greater than 0 and smaller than $K_G$;
    generate, as part of the second calculation sequence, a uniform random number $r_7$ that is an integer equal to or greater than 0 and smaller than $K_H$;
    calculate, as part of the second calculation sequence, fifth input information $g_3=g^{r_6}$;
    calculate, as part of the second calculation sequence, sixth input information $h_3=\mu_h^{r_7} \circ h$;
    calculate, as part of the second calculation sequence, $z_3 v'^{-r_6 r_7}$ using $z_3 \in F$ received from said calculating apparatus;
    store into a third memory area, as part of the second calculation sequence, an information set $(r_6, z_3 v'^{-r_6 r_7})$ composed of said $r_6$ and said calculated $z_3 v'^{-r_6 r_7}$;
    generate, as part of the second calculation sequence, a uniform random number $d_2$ that is an integer equal to or greater than 0 and smaller than K;
    generate, as part of the second calculation sequence, a uniform random number $r_9$ that is an integer equal to or greater than 0 and smaller than $K_G$;
    generate, as part of the second calculation sequence, a uniform random number $r_{10}$ that is an integer equal to or greater than 0 and smaller than $K_H$;
    calculate, as part of the second calculation sequence, seventh input information $g_4=\mu_g^{r_9}$;
    calculate, as part of the second calculation sequence, eighth input information $h_4=\mu_h^{r_{10}} \circ h^{d_2}$;
    calculate, as part of the second calculation sequence, $z_4 v'^{r_9 r_{10}}$ using $z_4 \in F$ received from said calculating apparatus;
    store into a fourth memory area, as part of the second calculation sequence, an information set $(d_2, r_9, z_4 v'^{-r_9 r_{10}})$ composed of said $d_2$, said $r_9$ and said calculated $z_4 v'^{-r_9 r_{10}}$; and
    determine, as a final step in the second calculation sequency, whether or not the information set read from said third memory area and the information set read from said fourth memory area satisfy a relation $(w_3)^\wedge(t_4s_4s_3^{-1})=w_4$, and output $(w_3)^\wedge(s_3^{-1})$ in a case where the relation is satisfied, where $s_3$ and $w_3$ are a first component and a second component of the information set read from said third memory area, respectively, and $t_4$, $s_4$ and $w_4$ are a first component, a second component and a third component of the information set read from said fourth memory area, respectively, and repeat the second calculation sequence when the information set read from said third memory area and the information set read from said fourth memory area do not satisfy a relation $(w_3)^\wedge(t_4s_4s_3^{-1})=w_4$, and said calculating apparatus comprises processing circuitry configured to:

calculate, as part of the first calculation sequence, $\theta(g_1, h_1)$ using $g_1$ and $h_1$ received from said requesting apparatus and outputs the calculation result as said $z_1$;

calculate, as part of the first calculation sequence, $\theta(g_2, h_2)$ using $g_2$ and $h_2$ received from said requesting apparatus and outputs the calculation result as said $z_2$;

calculate, as part of the second calculation sequence, $\theta(g_3,h_3)$ using $g_3$ and $h_3$ received from said requesting apparatus and outputs the calculation result as said $z_3$; and calculate, as part of the second calculation sequence, $\theta(g_4,h_4)$ using $g_4$ and $h_4$ received from said requesting apparatus and outputs the calculation result as said $z_4$, where G, H and F are cyclic groups, a map $\theta$: $G \times H \to F$ is a bi-homomorphism, g is an element of the group G, h is an element of the group H, $K_G$ is an order of the group G, $K_H$ is an order of the group H, $\mu_g$ is a generator of the group G, $\mu_h$ is a generator of the group H, $v=\theta(\mu_g, \mu_g)$, k is a security parameter that is a natural number, and $K=2^k$.

9. The proxy calculation system according to claim 8, wherein said processing circuitry of the requesting apparatus calculates first input information $g_1=g^{r_1}$, said processing circuitry of the requesting apparatus calculates $r_1r_2$ using said $r_1$ and said $r_2$, and said first memory area stores an information set $(r_1r_2, z_1)$ composed of said calculated $r_1r_2$ and $Z_1 \in F$ received from said calculating apparatus.

10. The proxy calculation system according to claim 8 or 9, wherein said processing circuitry of the requesting apparatus calculates sixth input information $h_3=h^{r_7}$, said processing circuitry of the requesting apparatus calculates $r_6r_7$ using said $r_6$ and said $r_7$, and said third memory area stores an information set $(r_6r_7, z_3)$ composed of said calculated $r_6r_7$ and $z_3 \in F$ received from said calculating apparatus.

11. The proxy calculation system according to claim 8 or 9, wherein said processing circuitry of the requesting apparatus substitutes $t_1s_2$ for $\sigma$ and $w_2$ for v' in a case where said relation is satisfied, and said processing circuitry of the requesting apparatus calculates $-r_9^{-1}$ using said $r_9$ and designates the calculation result as $r_{10}$.

12. The proxy calculation system according to claim 11, wherein said processing circuitry of the requesting apparatus calculates $-r_6^{-1}$ using said $r_6$ and designates the calculation result as $r_7$, and said third memory area stores an information set $(1, z_3v'^{r_6r_7})$ composed of 1 and said calculated $z_3v'^{-r_6r_7}$.

13. The proxy calculation system according to claim 8 or 9, wherein said processing circuitry of the requesting apparatus calculates $-r_5^{-1}$ using said $r_5$ and designates the calculation result as $r_4$.

14. The proxy calculation system according to claim 8 or 9, wherein the processing circuitry of the requesting apparatus further calculates $g^{d_1}$ using said $d_1$, and wherein said processing circuitry of the requesting apparatus calculates said $g_2$ using said previously calculated $g^{d_1}$.

15. The proxy calculation system according to claim 8 or 9, wherein the processing circuitry of the requesting apparatus further calculates $h^{d_2}$ using said $d_2$, and wherein said processing circuitry of the requesting apparatus calculates said $h_4$ using said previously calculated $h^{d_2}$.

16. A proxy calculation method of calculating $\theta(g, h)$ using a result of a calculation performed by a calculating apparatus, having processing circuitry, in response to a request from a requesting apparatus having processing circuitry, comprising:

starting, by the requesting apparatus, a first calculation sequence by generating a random number $r_1$ that is an integer equal to or greater than 0 and smaller than $K_G$;

generating, by the requesting apparatus, as part of the first calculation sequence, a random number $r_2$ that is an integer equal to or greater than 0 and smaller than $K_H$;

calculating, by the requesting apparatus, as part of the first calculation sequence, first input information $g_1=\mu_g^{r_1}g$;

calculating, by the requesting apparatus, as part of the first calculation sequence, second input information $h_1=\mu_h^{r_2}$;

calculating, by the calculating apparatus, as part of the first calculation sequence, $\theta(g_1, h_1)$ using $g_1$ and $h_1$ received from said requesting apparatus and outputting the calculation result as said $z_1$;

calculating, by the requesting apparatus, as part of the first calculation sequence, $z_1v^{-r_1r_2}$ using $z_1 \in F$ received from said calculating apparatus;

storing, by the requesting apparatus, into a first memory area, as part of the first calculation sequence, an information set $(r_2, z_1v^{-r_1r_2})$ composed of said random number $r_2$ and said calculated $z_1v^{-r_1r_2}$;

generating, by the requesting apparatus, as part of the first calculation sequence, a uniform random number $d_1$ that is an integer equal to or greater than 0 and smaller than K;

generating, by the requesting apparatus, as part of the first calculation sequence, a uniform random number $r_4$ that is an integer equal to or greater than 0 and smaller than $K_G$;

generating, by the requesting apparatus, as part of the first calculation sequence, a uniform random number $r_5$ that is an integer equal to or greater than 0 and smaller than $K_H$;

calculating, by the requesting apparatus, as part of the first calculation sequence, third input information $g_2=\mu_g^{r_4}g^{d_1}$;

calculating, by the requesting apparatus, as part of the first calculation sequence, fourth input information $h_2=\mu_h^{r_5}$;

calculating, by the calculating apparatus, as part of the first calculation sequence, $\theta(g_2, h_2)$ using $g_2$ and $h_2$ received from said requesting apparatus and outputting the calculation result as said $z_2$;

calculating, by the requesting apparatus, as part of the first calculation sequence, $z_2v^{-r_4r_5}$ using $z_2 \in F$ received from said calculating apparatus;

storing, by the requesting apparatus, into a second memory area, as part of the first calculation sequence, an information set $(d_1, r_5, Z_2v^{-r_4r_5})$ composed of said $d_1$, said $r_5$ and said calculated $z_2v^{-r_4r_5}$;

determining, by the requesting apparatus, as a final step in the first calculation sequence, whether or not the information set read from said first memory area and the information set read from said second memory area satisfy a relation $(w_1)\char`\^(t_2s_2s_1^{-1})=w_2$, and substituting $s_1$ for σ and $w_1$ for v' in a case where the relation is satisfied, where $s_1$ and $w_1$ are a first component and a second component of the information set read from said first memory area, respectively, and $t_2$, $s_2$ and $w_2$ are a first component, a second component and a third component of the information set read from said second memory area, respectively, and repeating the first calculation sequence when the information set read from said first memory and the information set read from said second memory area do not satisfy a relation $(w_1)\char`\^(t_2s_2s_1^{-1})=w_2$;

generating, by the requesting apparatus, when the first calculation sequence is completed and as a start of a second calculation sequence, a uniform random number $r_6$ that is an integer equal to or greater than 0 and smaller than $K_G$;

generating, by the requesting apparatus, as part of the second calculation sequence, a uniform random number $r_7$ that is an integer equal to or greater than 0 and smaller than $K_H$;

calculating, by the requesting apparatus, as part of the second calculation sequence, fifth input information $g_3=g^{r_6}$;

calculating, by the requesting apparatus, as part of the second calculation sequence, sixth input information $h_3=\mu_h^{r_7}\circ h$;

calculating, by the calculating apparatus, as part of the second calculation sequence, $\theta(g_3, h_3)$ using $g_3$ and $h_3$ received from said requesting apparatus and outputting the calculation result as said $z_3$;

calculating, by the requesting apparatus, as part of the second calculation sequence, $z_3v'^{-r_6r_7}$ using $z_3 \in F$ received from said calculating apparatus;

storing, by the requesting apparatus, into a third memory area, as part of the second calculation sequence, an information set $(r_6, z_3v'^{-r_6r_7})$ composed of said $r_6$ and said calculated $z_3v'^{-r_6r_7}$;

generating, by the requesting apparatus, as part of the second calculation sequence, a uniform random number $d_2$ that is an integer equal to or greater than 0 and smaller than K;

generating, by the requesting apparatus, as part of the second calculation sequence, a uniform random number $r_9$ that is an integer equal to or greater than 0 and smaller than $K_G$;

generating, by the requesting apparatus, as part of the second calculation sequence, a uniform random number $r_{10}$ that is an integer equal to or greater than 0 and smaller than $K_H$;

calculating, by the requesting apparatus, as part of the second calculation sequence, seventh input information $g_4=\mu_g^{r_9}$;

calculating, by the requesting apparatus, as part of the second calculation sequence, eighth input information $h_4=\mu_h^{r_{10}}\circ h^{d_2}$;

calculating, by the calculating apparatus, as part of the second calculation sequence, $\theta(g_4, h_4)$ using $g_4$ and $h_4$ received from said requesting apparatus and outputs the calculation result as said $z_4$;

calculating, by the requesting apparatus, as part of the second calculation sequence, $z_4v'^{-r_9r_{10}}$ using $z_4 \in F$ received from said calculating apparatus;

storing, by the requesting apparatus into a fourth memory area, as part of the second calculation sequence, an information set $(d_2, r_9, z_4v'^{-r_9r_{10}})$ composed of said $d_2$, said $r_9$ and said calculated $z_4v'^{-r_9r_{10}}$; and determining, by apparatus, as a final step in the second calculation sequency, whether or not the information set read from said third memory area and the information set read from said fourth memory area satisfy a relation $(w_3)\char`\^(t_4s_4s_3^{-1})=w_4$, and outputting $(w_3)\char`\^(s_3^{-1})$ in a case where the relation is satisfied, where $s_3$ and $w_3$ are a first component and a second component of the information set read from said third memory area, respectively, and $t_4$, $s_4$ and $w_4$ are a first component, a second component and a third component of the information set read from said fourth memory area, respectively, and repeating the second calculation sequence when the information set read from said third memory area and the information set read from said fourth memory area do not satisfy a relation $(w_3)\char`\^(t_4s_4s_3^{-1})=w_4$, where G, H and F are cyclic groups, a map $\theta: G \times H \rightarrow F$ is a bi-homomorphism, g is an element of the group G, h is an element of the group H, $K_G$ is an order of the group G, $K_H$ is an order of the group H, $\mu_g$ is a generator of the group G, $\mu_h$ is a generator of the group H, $v=\theta(\mu_g, \mu_h)$, k is a security parameter that is an integer, and $K=2^k$.

17. A requesting apparatus in a proxy calculation system that calculates $\theta(g, h)$ using a result of a calculation performed by a calculating apparatus in response to a request from the requesting apparatus, comprising:

processing circuitry configured to:

start a first calculation sequence by generating a random number $r_1$ that is an integer equal to or greater than 0 and smaller than $K_G$;

generate, as part of the first calculation sequence, a random number $r_2$ that is an integer equal to or greater than 0 and smaller than $K_H$;

calculate, as part of the first calculation sequence, first input information $g_1=\mu_g^{r_1}g$;

calculate, as part of the first calculation sequence, second input information $h_1=\mu_h^{r_2}$;

calculate, as part of the first calculation sequence, $z_1v^{-r_1r_2}$ using $z_1 \in F$ received from said calculating apparatus;

store into a first memory area, as part of the first calculation sequence, an information set $(r_2, z_1v^{-r_1r_2})$ composed of said random number $r_2$ and said calculated $z_1v^{-r_1r_2}$;

generate, as part of the first calculation sequence, a uniform random number $d_1$ that is an integer equal to or greater than 0 and smaller than K;

generate, as part of the first calculation sequence, a uniform random number $r_4$ that is an integer equal to or greater than 0 and smaller than $K_G$;

generate, as part of the first calculation sequence, a uniform random number $r_5$ that is an integer equal to or greater than 0 and smaller than $K_H$;

calculate, as part of the first calculation sequence, third input information $g_2=\mu_g^{r_4}g^{d_1}$;

calculate, as part of the first calculation sequence, fourth input information $h_2=\mu_h^{r_5}$;

calculate, as part of the first calculation sequence, $z_2v^{-r_4r_5}$ using $z_2 \in F$ received from said calculating apparatus;

store into a second memory area, as part of the first calculation sequence, an information set $(d_1, r_5, z_2v^{-r_4r_5})$ composed of said $d_1$, said $r_5$ and said calculated $z_2v^{-r_4r_5}$;

determine, as a final step in the first calculation sequence, whether or not the information set read from said first memory area and the information set read from said second memory area satisfy a relation $(w_1)^\wedge(t_2 s_2 s_1^{-1})=w_2$, and substitute $s_1$ for $\sigma$ and $w_1$ for $v'$ in a case where the relation is satisfied, where $s_1$ and $w_1$ are a first component and a second component of the information set read from said first memory area, respectively, and $t_2$, $s_2$ and $w_2$ are a first component, a second component and a third component of the information set read from said second memory area, respectively, and repeat the first calculation sequence when the information set read from said first memory and the information set read from said second memory area do not satisfy a relation $(w_1)^\wedge(t_2 s_2 s_1^{-1})=w_2$;

generate, when the first calculation sequence is completed and as a start of a second calculation sequence, a uniform random number $r_6$ that is an integer equal to or greater than 0 and smaller than $K_G$;

generate, as part of the second calculation sequence, a uniform random number $r_7$ that is an integer equal to or greater than 0 and smaller than $K_H$;

calculate, as part of the second calculation sequence, fifth input information $g_3 = g^{r_6}$;

calculate, as part of the second calculation sequence, sixth input information $h_3 = \mu_h^{r_7} \circ h$;

calculate, as part of the second calculation sequence, $z_3 v'^{-r_6 r_7}$ using $z_3 \in F$ received from said calculating apparatus;

store into a third memory area, as part of the second calculation sequence, an information set $(r_6, z_3 v'^{-r_6 r_7})$ composed of said $r_6$ and said calculated $z_3 v'^{-r_6 r_7}$;

generate, as part of the second calculation sequence, a uniform random number $d_2$ that is an integer equal to or greater than 0 and smaller than K;

generate, as part of the second calculation sequence, a uniform random number $r_9$ that is an integer equal to or greater than 0 and smaller than $K_G$;

generate, as part of the second calculation sequence, a uniform random number $r_{10}$ that is an integer equal to or greater than 0 and smaller than $K_H$;

calculate, as part of the second calculation sequence, seventh input information $g_4 = \mu_g^{r_9}$;

calculate, as part of the second calculation sequence, eighth input information $h_4 = \mu_h^{r_{10}} \circ h^{d_2}$;

calculate, as part of the second calculation sequence, $z_4 v'^{-r_9 r_{10}}$ using $z_4 \in F$ received from said calculating apparatus;

store into a fourth memory area, as part of the second calculation sequence, an information set $(d_2, r_9, z_4 v'^{-r_9 r_{10}})$ composed of said $d_2$, said $r_9$ and said calculated $z_4 v'^{-r_9 r_{10}}$; and determine, as a final step in the second calculation sequency, whether or not the information set read from said third memory area and the information set read from said fourth memory area satisfy a relation $(w_3)^\wedge(t_4 s_4 s_3^{-1})=w_4$, and output $(w_3)^\wedge(s_3^{-1})$ in a case where the relation is satisfied, where $s_3$ and $w_3$ are a first component and a second component of the information set read from said third memory area, respectively, and $t_4$, $s_4$ and $w_4$ are a first component, a second component and a third component of the information set read from said fourth memory area, respectively, and repeat the second calculation sequence when the information set read from said third memory area and the information set read from said fourth memory area do not satisfy a relation $(w_3)^\wedge(t_4 s_4 s_3^{-1})=w_4$ where G, H and F are cyclic groups, a map $\theta: G \times H \to F$ is a bi-homomorphism, g is an element of the group G, h is an element of the group H, $K_G$ is an order of the group G, $K_H$ is an order of the group H, $\mu_g$ is a generator of the group G, $\mu_h$ is a generator of the group H, $v = \theta(\mu_g, \mu_g)$, k is a security parameter that is a natural number, and $K = 2^k$.

18. A non-transitory computer-readable recording medium in which the program that makes a computer function as each part of a requesting apparatus according to claim 7 or 17 is recorded.

\* \* \* \* \*

UNITED STATES PATENT AND TRADEMARK OFFICE
CERTIFICATE OF CORRECTION

PATENT NO. : 9,037,623 B2  
APPLICATION NO. : 13/520491  
DATED : May 19, 2015  
INVENTOR(S) : Go Yamamoto et al.

Page 1 of 1

It is certified that error appears in the above-identified patent and that said Letters Patent is hereby corrected as shown below:

In the claims

Column 30, line 66, Claim 16, change "$(d_1, r_5, Z_2 v^{-r4r5})$" to --$(d_1, r_5, z_2 v^{-r4r5})$--.

Signed and Sealed this  
Fifth Day of January, 2016

Michelle K. Lee  
*Director of the United States Patent and Trademark Office*